United States Patent
Park

(10) Patent No.: US 9,815,467 B2
(45) Date of Patent: Nov. 14, 2017

(54) VEHICLE ASSISTANCE APPARATUS AND VEHICLE

(71) Applicant: LG ELECTRONICS INC., Seoul (KR)

(72) Inventor: Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/097,478

(22) Filed: Apr. 13, 2016

(65) Prior Publication Data

US 2017/0050641 A1 Feb. 23, 2017

(30) Foreign Application Priority Data

Aug. 19, 2015 (KR) .................. 10-2015-0116919

(51) Int. Cl.
| | |
|---|---|
| *B60W 30/00* | (2006.01) |
| *B60W 30/09* | (2012.01) |
| *B60Q 1/00* | (2006.01) |
| *B60Q 1/02* | (2006.01) |
| *B60Q 1/44* | (2006.01) |
| *B60W 30/18* | (2012.01) |

(52) U.S. Cl.
CPC ......... *B60W 30/18109* (2013.01); *B60Q 1/44* (2013.01); *B60W 2420/42* (2013.01); *B60W 2550/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,735,273 | A * | 4/1988 | Naito ................... | B60K 31/107 123/350 |
| 5,646,612 | A * | 7/1997 | Byon .................... | B60K 28/10 340/436 |
| 6,360,158 | B1 * | 3/2002 | Hanawa ............... | B60W 30/16 180/179 |
| 2004/0123831 | A1 * | 7/2004 | Grieser ................. | F02D 9/02 123/198 DB |

(Continued)

FOREIGN PATENT DOCUMENTS

| KR | 10-2012-0017690 | 2/2012 |
|---|---|---|
| KR | 10-1172303 | 8/2012 |

(Continued)

*Primary Examiner* — Yonel Beaulieu
(74) *Attorney, Agent, or Firm* — Fish & Richardson P.C.

(57) ABSTRACT

A vehicle assistance apparatus includes an interface unit configured to receive information regarding an electric current provided to a brake lamp of a vehicle. The vehicle assistance apparatus also includes an object detection unit configured to detect an object outside the vehicle, and a processor. The processor is configured to determine, based on the detected object, a speed of the vehicle and also determine, based on the speed of the vehicle and the information regarding the electric current provided to the brake lamp of the vehicle, whether the vehicle undergoes acceleration during a braking operation of the vehicle. The processor is further configured to provide, based on a determination that the vehicle undergoes acceleration during the braking operation of the vehicle, a control signal to restrict further acceleration of the vehicle.

18 Claims, 15 Drawing Sheets

(56) References Cited

U.S. PATENT DOCUMENTS

| | | | | |
|---|---|---|---|---|
| 2005/0033517 A1* | 2/2005 | Kondoh | ............... | B60K 26/021 |
| | | | | 701/301 |
| 2005/0187697 A1* | 8/2005 | Arai | ................. | B60K 31/0008 |
| | | | | 701/96 |
| 2008/0015744 A1* | 1/2008 | Lund | ................. | B60K 31/0058 |
| | | | | 701/2 |
| 2016/0200317 A1* | 7/2016 | Danzl | .................... | B60K 28/06 |
| | | | | 701/25 |

FOREIGN PATENT DOCUMENTS

| | | |
|---|---|---|
| KR | 10-2013-0070222 | 6/2013 |
| KR | 10-1283356 | 7/2013 |
| KR | 10-1378998 | 3/2014 |

* cited by examiner

VEHICLE ASSISTANCE APPARATUS AND VEHICLE

CROSS-REFERENCE TO RELATED APPLICATION

This application claims an earlier filing date and right of priority to Korean Patent Application No. 10-2015-0116919, filed on Aug. 19, 2015 in the Korean Intellectual Property Office, the disclosure of which is incorporated herein by reference in its entirety.

TECHNICAL FIELD

The present disclosure relates to a vehicle assistance apparatus.

BACKGROUND

A vehicle is an apparatus that is designed to be driven in a desired direction by a user. A representative example of a vehicle is a car.

For user convenience, a vehicle typically includes a variety of sensors and electronic devices. Particularly, a vehicle may include various apparatuses that provide driver assistance.

Examples of driver assistance apparatuses include various advanced driver assistance systems (ADASs) that provide automated functions to improve driver convenience. ADASs may be applied to commercial vehicles or private vehicles.

SUMMARY

Systems and techniques are disclosed that enable a vehicle assistance apparatus that determines whether a vehicle undergoes sudden unintended acceleration (SUA) based on detecting an on-state or an off-state of brake lamps of the vehicle and a speed of the vehicle detected by an object detection unit.

In one aspect, a vehicle assistance apparatus may include an interface unit configured to receive information regarding an electric current provided to a brake lamp of a vehicle. The vehicle assistance apparatus may also include an object detection unit configured to detect an object outside the vehicle. The vehicle assistance apparatus may further include a processor configured to: determine, based on the detected object, a speed of the vehicle; and determine, based on the determined speed of the vehicle and the information regarding the electric current provided to the brake lamp of the vehicle, whether the vehicle undergoes acceleration during a braking operation of the vehicle. The processor may further be configured to provide, based on a determination that the vehicle undergoes acceleration during the braking operation of the vehicle, a control signal to restrict further acceleration of the vehicle.

In some implementations, the object detection unit may include a camera configured to acquire images of the object outside the vehicle. The processor may be configured to determine the speed of the vehicle by: determining, based on the acquired images of the object, a time-variation of a size of the object in the acquired images; and determining, based on the determined rate of the time-variation of the size of the object in the acquired images, the speed of the vehicle.

In some implementations, the object detection unit may include a stereo camera configured to acquire stereo images of the object outside the vehicle. The processor may be configured to determine the speed of the vehicle by: determining, based on the acquired stereo images of the object, a disparity of the object in the acquired stereo images; and determining, based on the determined disparity of the object in the acquired stereo images, the speed of the vehicle.

In some implementations, the object detection unit may include at least one of a radar, a lidar, or an ultrasonic sensor. The processor may be configured to determine the speed of the vehicle by: determining a time of flight (TOF) to the object outside the vehicle; and determining, based on the determined TOF to the object, the speed of the vehicle.

In some implementations, the processor may be configured to determine that the vehicle undergoes acceleration during the braking operation of the vehicle by: determining whether the speed of the vehicle increases while the electric current flows to the brake lamp of the vehicle; and based on a determination that the speed of the vehicle increases while the electric current flows to the brake lamp, determine that the vehicle undergoes acceleration during the braking operation of the vehicle.

In some implementations, the interface unit may be configured to receive information regarding an acceleration pedal or a brake pedal of the vehicle. The processor may be configured to determine that the vehicle undergoes acceleration during the braking operation of the vehicle further based on the information regarding the acceleration pedal or the brake pedal of the vehicle.

In some implementations, the vehicle assistance apparatus may further include an optical sensor configured to sense an on-state or an off-state of the brake lamp of the vehicle. The processor may be configured to determine that the vehicle undergoes acceleration during the braking operation of the vehicle further based on the on-state or the off-state of the brake lamp of the vehicle.

In some implementations, the processor may be configured to provide the control signal to restrict further acceleration of the vehicle by providing a signal to switch, to an off-state, a throttle valve of the vehicle.

In some implementations, the processor may be configured to provide the control signal to restrict further acceleration of the vehicle by providing a signal for cutting power provided by a motor of the vehicle.

In some implementations, the processor may further be configured to transmit a test signal to a vehicle controller based on the determination that the vehicle undergoes acceleration during the braking operation of the vehicle. The processor may also be configured to receive, from the vehicle controller, a return signal corresponding to the transmitted test signal; and determine a state of the vehicle controller based on the received return signal.

In some implementations, the vehicle assistance apparatus may further include a communication unit configured to exchange data with an external device. The processor may further be configured to, based on the determination that the vehicle undergoes acceleration during the braking operation of the vehicle, transmit, to the external device, information regarding the acceleration during the braking operation of the vehicle.

In some implementations, the interface unit may further be configured to receive global positioning system (GPS) information of the vehicle. The processor may further be configured to, based on the determination that the vehicle undergoes acceleration during the braking operation of the vehicle, transmit the GPS information to the external device.

In some implementations, the object detection unit may include a camera configured to obtain image data. The processor may further be configured to, based on the determination that the vehicle undergoes acceleration during the braking operation of the vehicle, transmit the image data to the external device.

In another aspect, a vehicle assistance apparatus may include an object detection unit configured to detect an object outside a vehicle. The vehicle assistance apparatus may also include a communication unit configured to receive an image obtained by an adjacent vehicle. The vehicle assistance apparatus may further include a processor configured to: determine, based on the object detected outside the vehicle, a speed of the vehicle, detect, in the received image, an on-state or an off-state of a brake lamp of the vehicle, determine, based on the determined speed of the vehicle and the on-state or the off-state of the brake lamp, whether the vehicle undergoes acceleration during a braking operation of the vehicle, and provide, based on a determination that the vehicle undergoes acceleration during the braking operation of the vehicle, a control signal to restrict further acceleration of the vehicle.

In some implementations, the processor may be configured to determine that the vehicle undergoes acceleration during the braking operation of the vehicle by: determining that the brake lamp of the vehicle is in an on-state based on the received image obtained by the adjacent vehicle; determining whether the speed of the vehicle increases while the brake lamp of the vehicle is in an on-state; and based on a determination that the speed of the vehicle increases while the brake lamp of the vehicle is in an on-state, determining that the vehicle undergoes acceleration during the braking operation of the vehicle.

In some implementations, the processor may further be configured to determine that the vehicle undergoes acceleration during the braking operation of the vehicle by: detecting, in the received image, smoke that is generated between at least one tire of the vehicle and a road; and based on a detection that smoke is generated between at least one tire of the vehicle and the road, determining that the vehicle undergoes acceleration during the braking operation of the vehicle.

In some implementations, the communication unit may be configured to receive an external control signal from an external device. The processor may be configured to provide the control signal to restrict further acceleration of the vehicle by: determining whether the external control signal has been received from the external device; and based on a determination that the vehicle undergoes acceleration during the braking operation of the vehicle and that the external control signal has been received from the external device, providing the control signal to restrict further acceleration of the vehicle.

In some implementations, the external device may be another vehicle or a traffic control server.

In some implementations, the external control signal may be generated by a traffic control server that receives the image obtained by the adjacent vehicle.

In another aspect, a vehicle may include a vehicle assistance apparatus according to any of the implementations described above.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
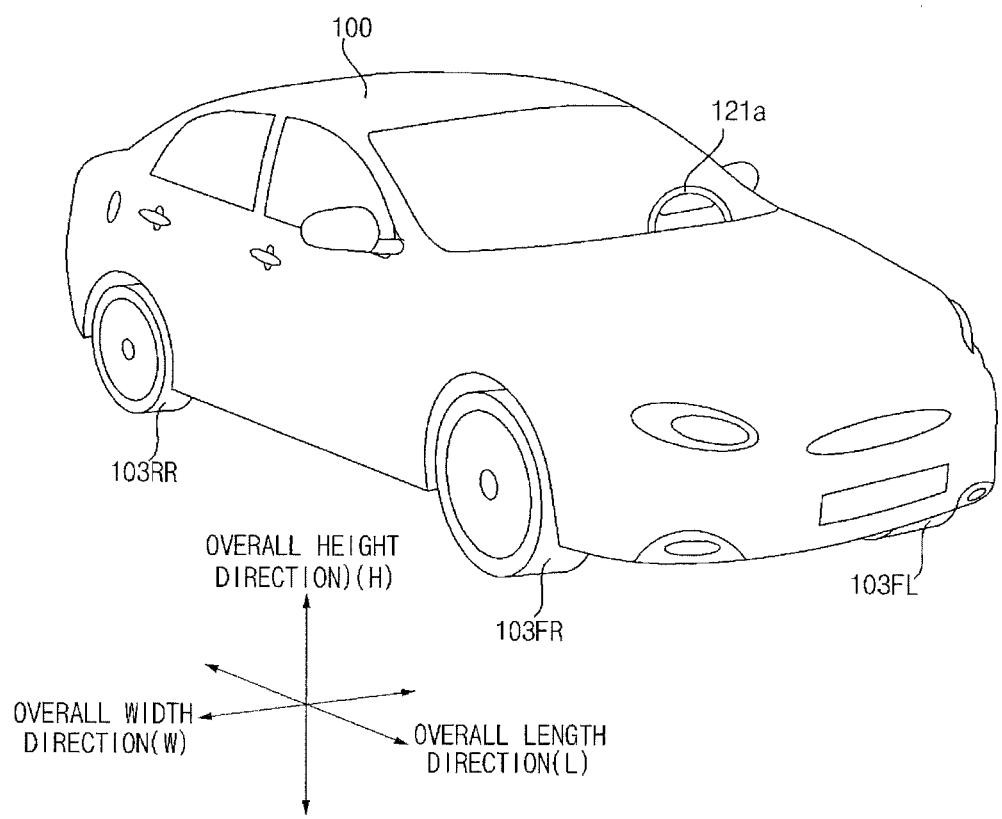
FIG. 1 is a block diagram illustrating an example of the exterior of a vehicle.

A large number of vehicle accidents occur due to sudden unintended acceleration (SUA). Typically, SUA occurs due to failure of a vehicle's acceleration system and/or brake system. SUA can occur even when a brake pedal of the vehicle is depressed, in which case the vehicle is driven at a high speed out of control, increasing the possibility of casualties.

Systems and techniques are disclosed for accurately determining whether a vehicle undergoes SUA and controlling a vehicle upon determining that it undergoes SUA. A vehicle assistance apparatus determines whether a vehicle undergoes sudden unintended acceleration (SUA) and implements appropriate actions to improve safety of the driver. The vehicle assistance apparatus may determine whether the vehicle undergoes SUA by using various techniques.

In some implementations, the vehicle assistance apparatus determines whether the vehicle undergoes SUA by detecting an on-state or an off-state of brake lamps of the vehicle and a speed of the vehicle. The speed of the vehicle may be determined by analyzing an environment around the vehicle, for example by analyzing signals detected by an object detection unit. Based on the detected state of the brake lamps and the speed of the vehicle, the vehicle assistance apparatus determines whether the vehicle undergoes SUA.

As another examples, in some implementations, the vehicle assistance apparatus determines whether the vehicle undergoes SUA by detecting smoke that is generated between at least one tire of the vehicle and a road.

If the vehicle assistance apparatus determines that a vehicle undergoes SUA, the vehicle assistance apparatus may take actions to improve safety. For example, the vehicle assistance apparatus may reduce or interrupt a source of power for the vehicle, to temporarily prevent acceleration of the vehicle.

A vehicle described in this disclosure may include a car, a motorcycle, or other suitable type of vehicle that transports people. The following description is focused on a car as the vehicle.

In addition, the vehicle described in this disclosure may include an engine vehicle including an internal combustion engine as a power source, a hybrid vehicle including both an internal combustion engine and an electric motor as power sources, and an electric vehicle including an electric motor as a power source, or generally a vehicle that is motorized by any suitable power source. Furthermore, the vehicle described in this disclosure may be an autonomous vehicle.

In the following description, the left of a vehicle refers to a left side based on a driving direction of the vehicle, and the right of the vehicle refers to a right side based on the driving direction of the vehicle.

A left-hand drive (LHD) vehicle refers to a vehicle in which a driver's seat is located at the left side of the vehicle. A right-hand drive (RHD) vehicle refers to a vehicle in which a driver's seat is located at the right side of the vehicle. LHD vehicles are used in countries where vehicles travel on a right side of two-way traffic, and RHD vehicles are used in countries where vehicles travel on a left side of two-way traffic.

Unless otherwise mentioned, the following description is focused on a left hand drive (LHD) vehicle. However, implementations are not limited therefore and may also apply to a right hand drive (RHD) vehicle.

FIG. 1 is a view showing the exterior of a vehicle 100, according to an implementation.

Referring to FIG. 1, the vehicle 100 may include wheels 103FR, 103FL, 103RL, . . . rotating due to power supplied from a power source, and a steering input unit 121*a* for steering the vehicle 100.

According to an implementation, the vehicle 100 may be an autonomous vehicle. If the vehicle 100 is an autonomous vehicle, the vehicle 100 may be switched to an autonomous mode or a manual mode based on user input. If the vehicle 100 is switched to the manual mode, the autonomous vehicle 100 may receive steering input using the steering input unit 121*a*.

An overall length refers to the length of the vehicle 100 from a front part to a back part, an overall width refers to the width of the vehicle 100, and an overall height refers to the height of the vehicle 100 from the bottom of wheels to a roof. In the following description, an overall length direction L may refer to a reference direction for measuring the overall length of the vehicle 100, an overall width direction W may refer to a reference direction for measuring the overall width of the vehicle 100, and an overall height direction H may refer to a reference direction for measuring the overall height of the vehicle 100.

In the following description, the vehicle 100 may be referred to as a user vehicle to be distinguished from another vehicle 390.

Figure 2A:
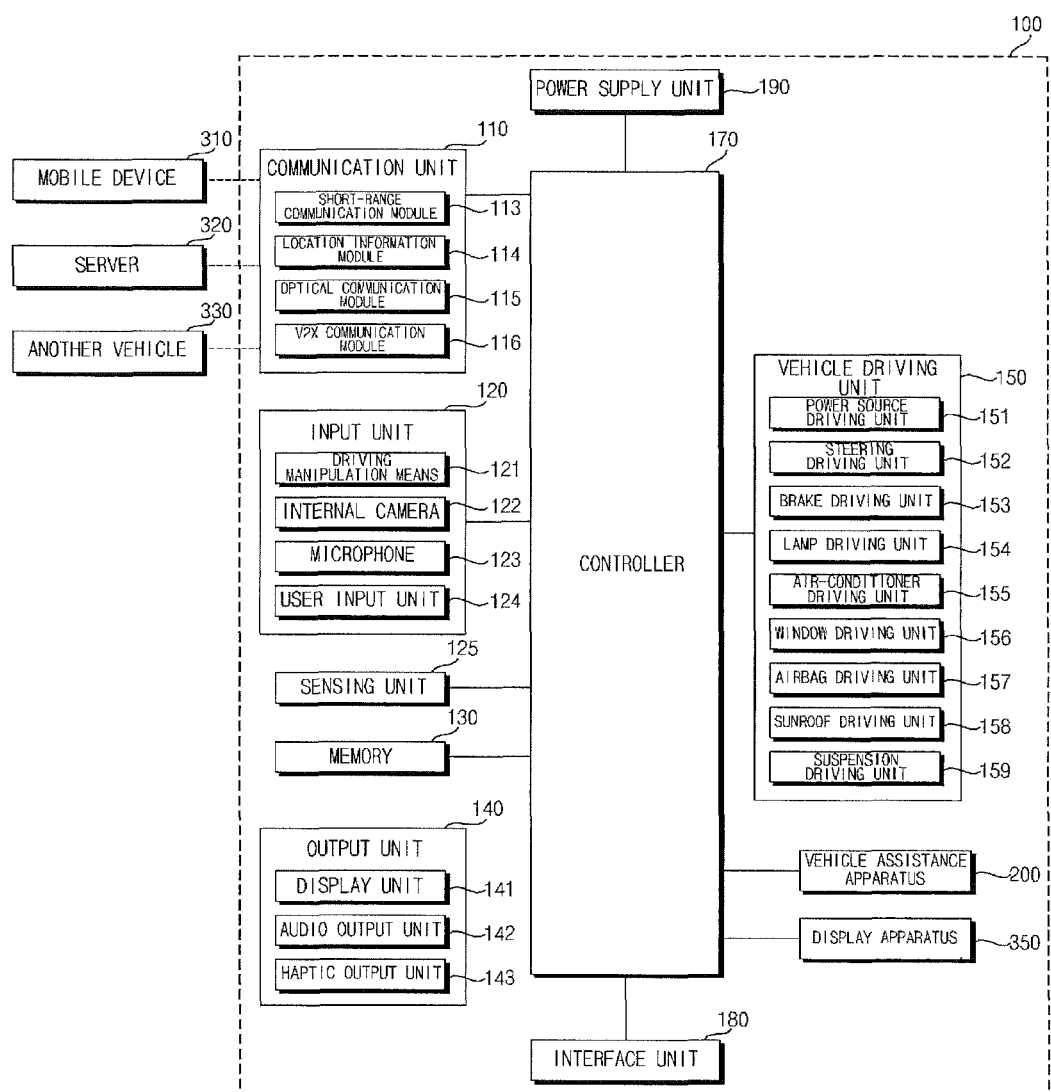
FIGS. 2A and 2B are block diagrams illustrating an example of a vehicle.
Figure 2B:
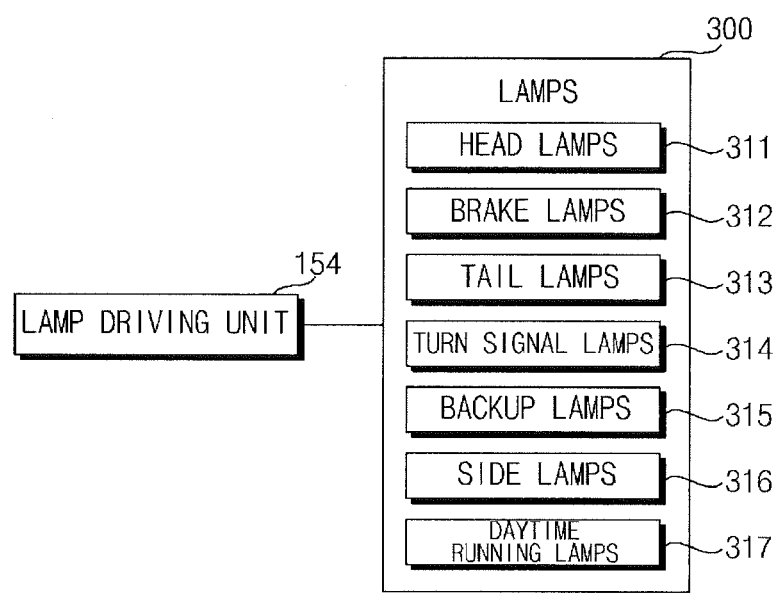

FIGS. 2A and 2B are block diagrams of the vehicle 100 of FIG. 1.

Referring to FIG. 2A, the vehicle 100 may include a communication unit 110, an input unit 120, a sensing unit 125, a memory 130, an output unit 140, a vehicle driving unit 150, a controller 170, an interface unit 180, a power supply unit 190, a vehicle assistance apparatus 200, and a display apparatus 350.

The communication unit 110 may include a short-range communication module 113, a location information module 114, an optical communication module 115, and a vehicle-to-X (V2X) communication module 116.

The short-range communication module 113 is used for short-range communication and may support short-range communication using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless Universal Serial Bus (Wireless USB) technologies.

The short-range communication module 113 may form a wireless local area network and perform short-range communication between the vehicle 100 and at least one external device. For example, the short-range communication module 113 may wirelessly exchange data with a mobile device 310. The short-range communication module 113 may receive weather information and traffic information (e.g., Transport Protocol Expert Group (TPEG) information) from the mobile device 310. If a user gets in the vehicle 100, the mobile device 310 of the user and the vehicle 100 may be paired with each other automatically or through execution of an application of the user.

The location information module 114 is a module for acquiring location information of the vehicle 100, and a representative example thereof is a global positioning system (GPS) module. For example, if the GPS module is used, the vehicle 100 may acquire the location information of the vehicle 100 using a signal transmitted from a GPS satellite.

According to an implementation, the location information module 114 may not be included in the communication unit 110 but may be included in the sensing unit 125.

The optical communication module 115 may include a light transmitter and a light receiver.

The light receiver may receive information by converting a light signal into an electrical signal. The light receiver may include a photodiode (PD) for receiving light. The PD may convert light into an electrical signal. For example, the light receiver may receive information about a vehicle ahead using light emitted from a light source of the vehicle ahead.

The light transmitter may include at least one light-emitting device for converting an electrical signal into a light signal. Herein, the light-emitting device may be a light-emitting diode (LED). The light transmitter converts an electrical signal into a light signal and emits the light signal. For example, the light transmitter may emit the light signal by turning on a light-emitting device corresponding to a certain frequency. According to an implementation, the light transmitter may include an array of a plurality of light-emitting devices. According to an implementation, the light transmitter may be integrated with lamps included in the vehicle 100. For example, the light transmitter may be at least one of head lamps, tail lamps, brake lamps, turn signal lamps, and side lamps. For example, the optical communication module 115 may exchange data with the other vehicle 390 through optical communication.

The V2X communication module 116 is a module for performing wireless communication with a server 380 or the other vehicle 390. The V2X communication module 116 includes a module capable of implementing a vehicle-to-vehicle (V2V) or vehicle-to-infrastructure (V2I) communication protocol. The vehicle 100 may perform wireless communication with the external server 380 and the other vehicle 390 using the V2X communication module 116.

The input unit 120 may include a driving manipulation unit 121, a camera 122, a microphone 123, and a user input unit 124.

The driving manipulation unit 121 receives user input for driving the vehicle 100. The driving manipulation unit 121 may include the steering input unit 121*a*, a shift input unit 121*b*, an acceleration input unit 121*c*, and a brake input unit 121*d*.

The steering input unit 121*a* receives driving direction input of the vehicle 100 from the user. The steering input unit 121*a* may be provided in the form of a wheel capable of providing steering input through rotation thereof. According to an implementation, the steering input unit 121*a* may alternatively be provided in the form of a touchscreen, a touchpad, or buttons.

The shift input unit 121*b* receives a park (P), drive (D), neutral (N), or reverse (R) input of the vehicle 100 from the user. The shift input unit 121*b* may be provided in the form of a lever. According to an implementation, the shift input unit 121*b* may alternatively be provided in the form of a touchscreen, a touchpad, or buttons.

The acceleration input unit 121*c* receives an input for accelerating the vehicle 100 from the user. The brake input unit 121*d* receives an input for decelerating the vehicle 100 from the user. The acceleration input unit 121*c* and the brake input unit 121*d* may be provided in the form of pedals. According to an implementation, the acceleration input unit 121*c* or the brake input unit 121*d* may alternatively be provided in the form of a touchscreen, a touchpad, or buttons.

The internal camera 122 may capture an inside image of the vehicle 100. The internal camera 122 may obtain an image of passengers.

A processor of the internal camera 122 may obtain an image of passengers riding in the vehicle 100, and detect the number of passengers and seats on which the passengers sit. For example, the internal camera 122 may detect whether or where the passengers ride in the vehicle 100.

The internal camera 195*c* may obtain an image for acquiring biometric information of the passengers. The processor of the internal camera 122 may check an ID of each passenger based on a face image of the passenger.

According to an implementation, the processor of the internal camera 122 may detect the type of each passenger based on the passenger image. For example, the processor of the internal camera 122 may detect whether a driver is an elderly, disabled, or pregnant person, using a certain image processing algorithm.

The microphone 123 may process an external audio signal into electrical data. The processed data may be utilized in various ways based on a function currently performed by the vehicle 100. The microphone 123 may convert a voice command of the user into electrical data. The converted electrical data may be transmitted to the controller 170.

According to an implementation, the camera 122 or the microphone 123 may not be included in the input unit 120 but may be included in the sensing unit 125.

The user input unit 124 is used to receive information from the user. If information is input using the user input unit 124, the controller 170 may control operation of the vehicle 100 to correspond to the input information. The user input unit 124 may include a touch input unit or a mechanical input unit. According to an implementation, the user input unit 124 may be provided on a partial region of a steering wheel. In this case, the driver may manipulate the user input unit 124 with fingers while gripping the steering wheel.

The sensing unit 125 senses various states of the vehicle 100. To this end, the sensing unit 125 may include a crash sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor, a vehicle internal temperature sensor, a vehicle internal humidity sensor, an ultrasonic sensor, an illumination sensor, an acceleration pedal position sensor, a brake pedal position sensor, etc.

As such, the sensing unit 125 may acquire sensing signals related to vehicle crash information, vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, vehicle internal humidity information, steering wheel rotation angle information, vehicle external illumination information, pressure information applied to an acceleration pedal, pressure information applied to a brake pedal, etc.

In some implementations, the sensing unit 125 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), etc.

The location information module 114 may be an element of the sensing unit 125. In addition, the camera 122 may be an element of the sensing unit 125.

The memory 130 is electrically connected to the controller 170. The memory 130 may store basic data about each element, control data for controlling operation of each element, and input and output data. The memory 130 may include a variety of storage devices such as a read-only memory (ROM), a random access memory (RAM), an erasable programmable read-only memory (EPROM), a flash drive, and a hard drive, in terms of hardware. The memory 130 may store various types of data for overall operation of the vehicle 100, e.g., programs for process or control operations of the controller 170.

The output unit 140 is used to output information processed by the controller 170, and may include a display unit 141, an audio output unit 142, and a haptic output unit 143.

The display unit 141 may display the information processed by the controller 170. For example, the display unit 141 may display vehicle information. Herein, the vehicle information may include vehicle control information for directly controlling the vehicle 100, or driver assistance information for providing driving guide service to the driver of the vehicle 100. In addition, the vehicle information may include vehicle state information indicating a current state of the vehicle 100, or vehicle driving information related to driving of the vehicle 100.

The display unit 141 may include at least one of a liquid crystal display (LCD), a thin film transistor-liquid crystal display (TFT LCD), an organic light-emitting diode (OLED), a flexible display, a 3-dimensional (3D) display, and an electrophoretic ink (e-ink) display.

The display unit 141 may be layered on or integrated with a touch sensor, and thus may implement a touchscreen. The touchscreen may serve as the user input unit 124 for providing an input interface between the vehicle 100 and the user and, at the same time, provide an output interface between the vehicle 100 and the user. In this case, the display unit 141 may include a touch sensor for sensing touch on the display unit 141, and thus may receive a control command input using touch. As such, if the display unit 141 is touched, the touch sensor may sense the touch and the controller 170 may generate a control command corresponding to the touch. An input using touch may be, for example, text, a number, or a menu item which can be indicated or specified in various modes.

In some implementations, the display unit 141 may include a cluster such that the driver may check the vehicle state information or the vehicle driving information immediately after the driver starts driving. The cluster may be provided on a dashboard.

In this case, the driver may check the information displayed on the cluster while continuously looking ahead.

According to an implementation, the display unit 141 may be implemented as a head up display (HUD). If the display unit 141 is implemented as a HUD, the display unit 141 may output the information using a transparent display included in the windshield. Alternatively, the display unit 141 may include a projection module and thus may output the information using an image projected onto the windshield.

According to an implementation, the display unit 141 may be integrated with the display apparatus 400 to be described below.

According to an implementation, the display unit 141 may include a transparent display. In this case, the transparent display may be attached to the windshield The transparent display may display a certain screen with a certain transparency. To have transparency, the transparent display may include at least one of a transparent thin film electroluminescent (TFEL) display, a transparent organic light-emitting diode (OLED), a transparent liquid crystal display (LCD), a transmissive transparent display, and a transparent light-emitting diode (LED). The transparency of the transparent display is adjustable.

The audio output unit 142 converts an electrical signal received from the controller 170, into an audio signal and outputs the audio signal. To this end, the audio output unit 142 may include, for example, a speaker. The audio output unit 142 may also output sound corresponding to operation of the user input unit 124.

The haptic output unit 143 generates a haptic output. For example, the haptic output unit 143 may vibrate the steering wheel, a seat belt, or a seat to make the user recognize the output.

The vehicle driving unit 150 may control operations of various apparatuses of the vehicle 100. The vehicle driving unit 150 may include a power source driving unit 151, a steering driving unit 152, a brake driving unit 153, a lamp driving unit 154, an air-conditioner driving unit 155, a window driving unit 156, an airbag driving unit 157, a sunroof driving unit 158, and a suspension driving unit 159.

The power source driving unit 151 may electronically control a power source of the vehicle 100.

For example, if an engine (not shown) based on fossil fuel is the power source, the power source driving unit 151 may electronically control the engine. As such, the power source driving unit 151 may control, for example, an output torque of the engine. When the power source driving unit 151 is an engine, the power source driving unit 151 may limit the speed of the vehicle 100 by restricting an output torque of the engine under control of the controller 170.

As another example, if a motor (not shown) based on electricity is a power source, the power source driving unit 151 may control the motor. As such, the power source driving unit 151 may control, for example, the speed and torque of the motor. The steering driving unit 152 may electronically control a steering apparatus of the vehicle 100. As such, the steering driving unit 152 may steer the vehicle.

The brake driving unit 153 may electronically control a brake apparatus (not shown) of the vehicle 100. For example, the brake driving unit 153 may control operation of brakes provided to wheels, and thus reduce the speed of the vehicle 100. As another example, the brake driving unit 153 may differently control operations of brakes provided to a left wheel and a right wheel, and thus may adjust the driving direction of the vehicle 100 to the left or right.

The lamp driving unit 154 may control lamps provided inside or outside the vehicle 100, to be turned on or off. In addition, the lamp driving unit 154 may control, for example, the intensity and direction of light provided by the lamps. For example, the lamp driving unit 154 may control turn signal lamps and brake lamps.

The air-conditioner driving unit 155 may electronically control an air-conditioner (not shown) of the vehicle 100. For example, if the temperature inside the vehicle 100 is high, the air-conditioner driving unit 155 may control the air-conditioner to supply cool air into the vehicle 100.

The window driving unit 156 may electronically control a window apparatus of the vehicle 100. For example, the window driving unit 156 may control left and right windows of the vehicle 100 to be opened or closed.

The airbag driving unit 157 may electronically control an airbag apparatus of the vehicle 100. For example, the airbag driving unit 157 may control an airbag to inflate when the vehicle 100 crashes.

The sunroof driving unit 158 may electronically control a sunroof apparatus (not shown) of the vehicle 100. For example, the sunroof driving unit 158 may control the sunroof to be opened or closed.

The suspension driving unit 159 may electronically control a suspension apparatus (not shown) of the vehicle 100. For example, the suspension driving unit 159 may control the suspension apparatus on a bumpy road to reduce impact applied to the vehicle 100.

According to an implementation, the vehicle driving unit 150 may include a chassis driving unit. Herein, the chassis driving unit may include the steering driving unit 152, the brake driving unit 153, and the suspension driving unit 159.

The controller 170 may control overall operations of elements of the vehicle 100. The controller 170 may be called an electronic control unit (ECU).

The controller 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions, in terms of hardware.

The interface unit 180 may serve as a path to/from various external devices connected to the vehicle 100. For example, the interface unit 180 may include a port connectable to the mobile device 310, and may be connected through the port to the mobile device 310. In this case, the interface unit 180 may exchange data with the mobile device 310.

In some implementations, the interface unit 180 may serve as a path for supplying electrical energy to the connected mobile device 310. If the mobile device 310 is electrically connected to the interface unit 180, the interface unit 180 provides electrical energy supplied from the power source unit 190, to the mobile device 310 under control of the controller 170.

The power source unit 190 may supply power necessary for operation of each element under control of the controller 170. Particularly, the power source unit 190 may receive power supplied from, for example, a battery (not shown) of the vehicle 100.

Referring to FIG. 2B, the vehicle 100 may include lamps 300. The lamps 300 may operate under control of the lamp driving unit 154.

The lamps 300 may include head lamps 311, brake lamps 312, tail lamps 313, turn signal lamps 314, backup lamps 315, side lamps 316, and daytime running lamps 317. Particularly, the brake lamps 312 are turned on when a brake pedal is depressed, and turned off when the brake pedal is not depressed.

Figure 7:
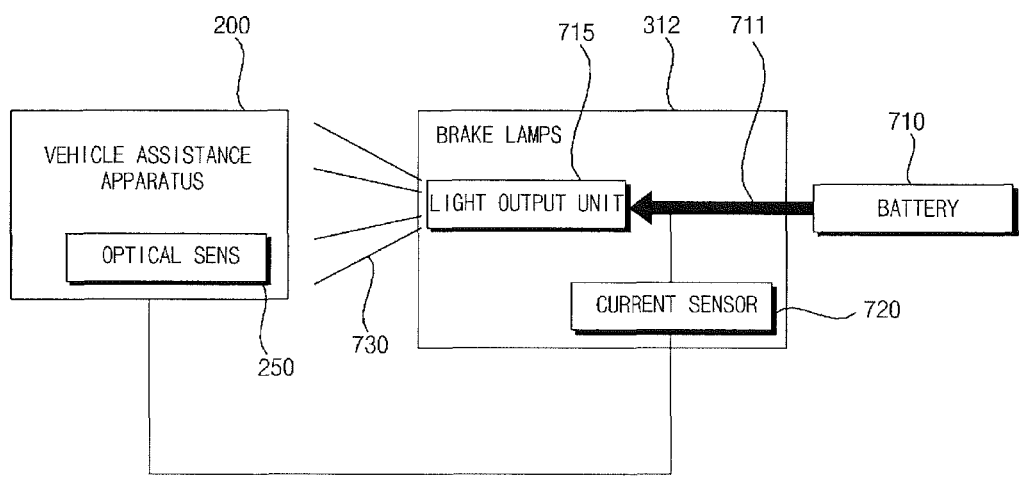
FIG. 7 is a diagram illustrating an example of an operation for checking on or off state of brake lamps.

The brake lamps 312 may include an electric current sensor 720 (see FIG. 7). The electric current sensor 720 may sense an electric current flowing from a battery 710 (see FIG. 7) to the brake lamps 312.

Figure 3:
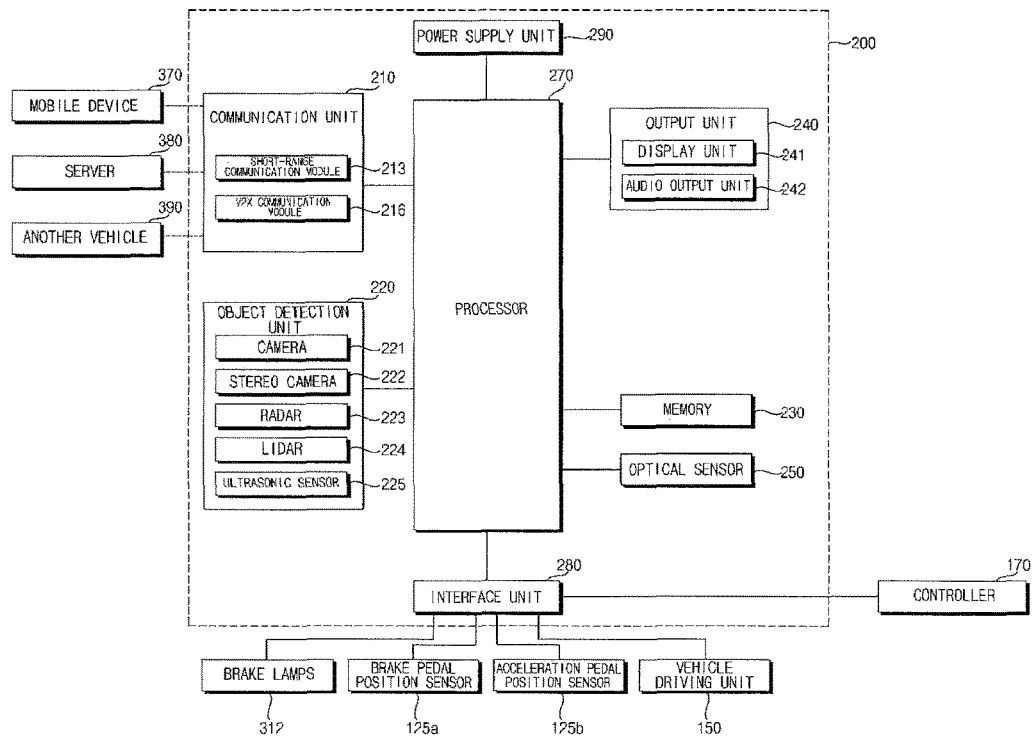
FIG. 3 is a block diagram illustrating an example of a vehicle assistance apparatus.

FIG. 3 is a block diagram of the vehicle assistance apparatus 200 according to an implementation.

Referring to FIG. 3, the vehicle assistance apparatus 200 may include a communication unit 210, an object detection unit 220, a memory 230, an output unit 240, an optical sensor 250, a processor 270, an interface unit 280, and a power supply unit 290.

The communication unit 210 may include a short-range communication module 213 and a vehicle-to-X (V2X) communication module 216. The communication unit 210 may receive image data obtained by an adjacent vehicle.

In some implementations, the communication unit 210 may receive an external control signal from an external device 370, 380, or 390.

The short-range communication module 213 is used for short-range communication and may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The short-range communication module 213 may form a wireless local area network and perform short-range communication between the vehicle 100 and at least one external device. For example, the short-range communication module 213 may wirelessly exchange data with a mobile device 370. The short-range communication module 213 may receive weather information and traffic information (e.g., Transport Protocol Expert Group (TPEG) information) from the mobile device 370. If a user gets in the vehicle 100, the mobile device 370 of the user and the vehicle 100 may be paired with each other automatically or through execution of an application by the user.

The V2X communication module 216 is a module for performing wireless communication with a server 380 or another vehicle 390. The V2X communication module 216 includes a module capable of implementing a vehicle-to-vehicle (V2V) or vehicle-to-infrastructure (V2I) communication protocol. The vehicle 100 may perform wireless communication with the external server 380 and the other vehicle 390 using the V2X communication module 216.

The V2X communication module 216 may exchange data with the other vehicle 390 located near the vehicle 100. Particularly, the V2X communication module 216 may receive image data obtained by the other vehicle 390, from the other vehicle 390 located near the vehicle 100. The received image data may be transmitted to the processor 270.

The V2X communication module 216 may receive an external control signal from the external device 380 or 390. The external device 380 or 390 may be the traffic control server 380 or the other vehicle 390 located near the user vehicle 100.

For example, the V2X communication module 216 may transmit sudden unintended acceleration (SUA) information to the external device 380 or 390 under control of the processor 270. The external device 380 or 390 may provide an external control signal for cutting power of the user vehicle 100, in response to the received SUA information. In this case, the V2X communication module 216 may receive the external control signal and transmit the same to the processor 270.

The object detection unit 220 may sense an object near the vehicle 100.

The object detection unit 220 may include a camera 221, a stereo camera 222, a radar 223, a lidar 224, and an ultrasonic sensor 225. According to an implementation, the vehicle 100 may selectively include one or more of the camera 221, the stereo camera 222, the radar 223, the lidar 224, and the ultrasonic sensor 225.

The camera 221 may include an image sensor and an image processing module. The camera 221 may process a still image or a moving image obtained by the image sensor (e.g., a complementary metal oxide semiconductor (CMOS) or a charge-coupled device (CCD)). The image processing module may extract necessary information by processing the still or moving image obtained by the image sensor, and transmit the extracted information to the controller 170.

The vehicle 100 may include a mono camera 221a, a stereo camera 221b, a time of flight (TOF) camera 221c, and an around view camera 221d for capturing an around-vehicle image. Each of the cameras 221a, 221b, 221c, and 221d may include a lens, an image sensor, and a processor. The processor may generate data or information by computer-processing a captured image and transmit the generated data or information to the controller 170.

The processor included in the camera 221 may be controlled by the processor 270 of the vehicle assistance apparatus 200.

In some implementations, the camera 221 may store an image obtained when SUA occurs in the vehicle 100, under control of the processor 270. In this case, the image may be stored in an internal memory of the camera 221 or in the memory 230 of the vehicle assistance apparatus 200.

The processor included in the camera 221 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions, in terms of hardware.

The mono camera 221a may detect an object in an ahead-vehicle image or an around-vehicle image. The mono camera 221a may track the detected object. The mono camera 221a may calculate a distance from the vehicle 100 to the object based on a variation in size of the object detected in sequentially obtained images as time passes. The mono camera 221a may calculate a speed relative to the object based on the calculated distance. Specifically, the mono camera 221a may calculate the relative speed based on a variation in distance as time passes.

In some implementations, if the object is a still object (e.g., a tree, a street light, a traffic light, or a traffic sign), the mono camera 221a may detect a driving speed of the vehicle 100 based on a speed relative to the object.

The stereo camera 221b may detect a distance to an object, a speed relative to the object, and distances among a plurality of objects using a disparity detected in stereo images.

In some implementations, if the object is a still object (e.g., a tree, a street light, a traffic light, or a traffic sign), the stereo camera 221b may detect a driving speed of the vehicle 100 based on a speed relative to the object.

The TOF camera 221c may include a light source (e.g., an infrared light or laser projector) and a receiver. In this case, the processor of the TOF camera 221c may detect a distance to an object, a speed relative to the object, and distances among a plurality of objects based on a TOF taken until an infrared light or laser beam projected from the light source is reflected from the object and then received.

In some implementations, if the object is a still object (e.g., a tree, a street light, a traffic light, or a traffic sign), the TOF camera 221c may detect a driving speed of the vehicle 100 based on a speed relative to the object.

The around view camera 221d may include multiple cameras. For example, the multiple cameras may be located at left, rear, right, and front sides of the vehicle 100. The left camera may be located inside a case surrounding a left side mirror.

Alternatively, the left camera may be located outside the case surrounding the left side mirror. Otherwise, the left camera may be located in a region outside a left front door, a left rear door, or a left fender.

The right camera may be located inside a case surrounding a right side mirror. Alternatively, the right camera may be located outside the case surrounding the right side mirror. Otherwise, the right camera may be located in a region outside a right front door, a right rear door, or a right fender.

In some implementations, the rear camera may be located near a rear license plate, a trunk, or a tailgate switch.

The front camera may be located near an emblem or a radiator grille.

Images captured by the multiple cameras may be transmitted to the processor of the around view camera 221d, and the processor may generate an around-vehicle image by combining the images. In this case, the around-vehicle image may be displayed on the display unit 141 as a top-view image or a bird's-eye image.

Each of the cameras included in the around view camera 221d may detect and track an object near the vehicle 100 in the same manner as the above-described mono camera 221a. In addition, each of the cameras may detect a distance to and a speed relative to the object.

The radar 223 may include an electromagnetic wave transmitter, a receiver, and a processor. The radar 223 may be implemented as a pulse radar or a continuous wave radar depending on a wave transmission scheme thereof. In addition, the continuous wave radar may be implemented as a frequency modulated continuous wave (FMCW) radar or a frequency-shift keying (FSK) radar depending on a signal waveform thereof.

The radar 223 may detect an object based on a transmitted electromagnetic wave and detect a distance to and a speed relative to the detected object. If the object is a still object (e.g., a tree, a street light, a traffic light, or a traffic sign), the radar 223 may detect a driving speed of the vehicle 100 based on a TOF to the object.

The lidar 224 may include a laser transmitter, a receiver, and a processor. The lidar 224 may be implemented as a TOF lidar or a phase-shift lidar.

The TOF lidar 224 projects a laser pulse signal and receives a pulse signal reflected from an object. The lidar 224 may measure a distance to the object based on a time taken from when the laser pulse signal is projected until when the reflective pulse signal is received. In addition, the lidar 224 may measure a speed relative to the object based on a variation in distance as time passes.

In some implementations, the phase-shift lidar 224 projects a laser beam having a specific frequency and repeatedly modulated, and may measure a time and a distance to an object based on the size of phase shift of the signal reflected from the object. In addition, the lidar 224 may measure a speed relative to the object based on a variation in distance as time passes.

The lidar 224 may detect an object based on a transmitted laser and detect a distance to and a speed relative to the detected object. If the object is a still object (e.g., a tree, a street light, a traffic light, or a traffic sign), the lidar 224 may detect a driving speed of the vehicle 100 based on a TOF to the object.

The ultrasonic sensor 225 may include an ultrasonic transmitter, a receiver, and a processor.

The ultrasonic sensor 225 may detect an object based on a transmitted ultrasonic wave and detect a distance to and a speed relative to the detected object. If the object is a still object (e.g., a tree, a street light, a traffic light, or a traffic sign), the ultrasonic sensor 225 may detect a driving speed of the vehicle 100 based on a TOF to the object.

The memory 230 is electrically connected to the processor 270. The memory 230 may store basic data about each element, control data for controlling operation of each element, and input and output data. The memory 230 may include a variety of storage devices such as a read-only memory (ROM), a random access memory (RAM), an erasable programmable read-only memory (EPROM), a flash drive, and a hard drive, in terms of hardware. The memory 130 may store various types of data for overall operation of the vehicle assistance apparatus 200, e.g., programs for process or control operations of the processor 270.

The output unit 240 is used to output information processed by the processor 270, and may include a display unit 241 and an audio output unit 242.

The display unit 241 may display the information processed by the processor 270. For example, the display unit 241 may display vehicle information. Herein, the vehicle information may include vehicle control information for directly controlling the vehicle 100, or driver assistance information for providing driving guide service to the driver of the vehicle 100. In addition, the vehicle information may include vehicle state information indicating a current state of the vehicle 100, or vehicle driving information related to driving of the vehicle 100.

The display unit 241 may include at least one of a liquid crystal display (LCD), a thin film transistor-liquid crystal display (TFT LCD), an organic light-emitting diode (OLED), a flexible display, a 3-dimensional (3D) display, and an electrophoretic ink (e-ink) display.

The display unit 141 may be layered on or integrated with a touch sensor, and thus may implement a touchscreen. The touchscreen may serve as the user input unit 124 for providing an input interface between the vehicle assistance apparatus 200 and the user and, at the same time, provide an output interface between the vehicle assistance apparatus 200 and the user. In this case, the display unit 241 may include a touch sensor for sensing touch on the display unit 241, and thus may receive a control command input using touch. As such, if the display unit 241 is touched, the touch sensor may sense the touch and the processor 270 may generate a control command corresponding to the touch. An input using touch may be, for example, text, a number, or a menu item which can be indicated or specified in various modes.

In some implementations, the display unit 241 may be implemented in such a manner that a screen thereof is displayed on a part of a windshield.

The display unit 241 may include a transparent display. In this case, the transparent display may be attached to the windshield. In this case, the vehicle assistance apparatus 200 may output information using the transparent display.

The transparent display may display a certain screen with a certain transparency. To have transparency, the transparent display may include at least one of a transparent thin film electroluminescent (TFEL) display, a transparent organic light-emitting diode (OLED), a transparent liquid crystal display (LCD), a transmissive transparent display, and a transparent light-emitting diode (LED).

In some implementations, the transparency of the transparent display may be adjusted under control of the processor 270.

The display unit 241 may include a projection module. In this case, the vehicle assistance apparatus 200 may output information using an image projected onto the windshield.

The projection module projects beams toward the windshield. The projection module may include a light source and a projection lens. The projection module may implement an image corresponding to information processed by the processor 270. That is, the projection module may implement an image using light generated by the light source, and project the implemented image onto the windshield. In this case, the light source may use an LED, a laser, or the like.

The display unit 241 may display SUA information under control of the processor 270.

The audio output unit 242 converts an electrical signal received from the processor 270, into an audio signal and outputs the audio signal. To this end, the audio output unit 242 may include, for example, a speaker. The audio output unit 242 may also output sound corresponding to operation of the object detection unit 220.

The audio output unit 242 may output SUA information using sound under control of the processor 270.

The optical sensor 250 may be located near the brake lamps 312 provided at the back of the vehicle 100. The optical sensor 250 may sense whether the brake lamps are on or off. The optical sensor 250 may sense light output from the brake lamps 312 and sense on or off state of the brake lamps 312 based on the sensed information. According to an implementation, the optical sensor 250 may sense red light.

The optical sensor 250 may include at least one device for converting light into an electrical signal. For example, the optical sensor 250 may include a photodiode or a phototransistor.

The processor 270 controls overall operations of elements of the vehicle assistance apparatus 200.

The processor 270 may control the output unit 240 to output information or data received by the communication unit 210, the object detection unit 220, or the interface unit 280. The processor 270 may control the output unit 240 to output information or data stored in the memory 230. The processor 270 may output the received information or data directly or through processing. The processor 270 may visually output the information or data using the display unit 241. The processor 270 may audibly output the information or data using the audio output unit 242.

The processor 270 may detect a driving speed based on the object detected by the object detection unit 220.

The processor 270 may calculate a distance to and a speed relative to the detected object. Alternatively, the processor 270 may receive information about the distance to and the speed relative to the object from the object detection unit 220.

As an example, the processor 270 may detect the distance from the vehicle 100 to the object and the speed relative to the object based on a variation in size of the object detected in images sequentially obtained by the mono camera 221a as time passes.

As another example, the processor 270 may detect the distance to and the speed relative to the object using a disparity detected in stereo images obtained by the stereo camera 221b.

As another example, the processor 270 may detect the distance to and the speed relative to the object based on a TOF to the object detected by the radar 223, the lidar 224, or the ultrasonic sensor 225.

If the object is a still object (e.g., a tree, a street light, a traffic light, or a traffic sign), the processor 270 may detect the driving speed of the vehicle 100 based on the speed relative to the object.

The processor 270 may receive on or off state information of the brake lamps 312 from the brake lamps 312. The processor 270 may receive electric current information about an electric current flowing from the battery 710 (see FIG. 7) to the brake lamps 312, from the electric current sensor 720 (see FIG. 7) of the brake lamps 312. If an electric current having a value equal to or greater than a reference value flows to the brake lamps 312, the processor 270 may determine that the brake lamps 312 are on.

In some implementations, the processor 270 may receive on or off state information of the brake lamps 312 from the optical sensor 250. If the optical sensor 250 senses light having a value equal to or greater than a reference value, the processor 270 may determine that the brake lamps 312 are on.

The processor 270 may determine whether SUA occurs, based on the driving speed and the on-state or the off-state information of the brake lamps 312. Herein, the on or off state information of the brake lamps 312 may be acquired based on information received from the electric current sensor 720 (see FIG. 7) of the brake lamps 312, or the optical sensor 250.

If the driving speed increases while the brake lamps 312 are on, the processor 270 may determine that SUA occurs.

In some implementations, the processor 270 may determine whether SUA occurs, based on pedaling information of an acceleration pedal or a brake pedal. The pedaling information of the acceleration pedal or the brake pedal may be received from the acceleration pedal position sensor or the brake pedal position sensor using the interface unit 280.

If the vehicle 100 is accelerated while the acceleration pedal is not depressed, the processor 270 may determine that SUA occurs in the vehicle 100.

If the vehicle 100 is accelerated while the brake pedal is depressed, the processor 270 may determine that SUA occurs in the vehicle 100.

In some implementations, upon determining that SUA occurs, the processor 270 may transmit a test signal to the controller 170. The processor 270 may determine whether the controller 170 malfunctions, by receiving a return signal corresponding to the test signal. Upon determining that the controller 170 malfunctions, the processor 270 may ultimately determine an SUA state of the vehicle 100. As described above, when SUA is determined, by further determining whether the controller 170 malfunctions, the reliability of the determination of SUA may be increased.

Upon determining that SUA occurs, the processor 270 may provide a control signal for cutting power supplied to the vehicle 100. Herein, the control signal may be transmitted to the power source driving unit 151.

As an example, if the vehicle 100 uses an internal combustion engine, the processor 270 may provide a power cut control signal to a throttle body. Herein, the power cut control signal may be a control signal for switching a throttle valve to a closed state to cut fuel.

As another example, if the vehicle 100 uses an electric motor, the processor 270 may provide a power cut control signal to a motor controller. Herein, the power cut control signal may be a control signal for cutting power provided by the motor.

Upon determining that SUA occurs, the processor 270 may transmit SUA information to the external device 370, 380, or 390. Herein, the external device 370, 380, or 390 may be the mobile device 370, the external server 380, or the other vehicle 390. The external server 380 may be a traffic control server.

The processor 270 may transmit the SUA information to the external device 370, 380, or 390 together with GPS information of the vehicle 100. As described above, by transmitting the SUA information and the GPS information, a traffic control center or other vehicles may rapidly check an SUA state and the location of the vehicle 100.

Upon determining that SUA occurs in the vehicle 100, the processor 270 may transmit image data obtained by the camera 221, to the external device 370, 380, or 390. In this case, the image data may be real-time image data obtained by the camera 221. Alternatively, the image data may be image data stored in the memory 230 from when the processor 270 determines that SUA occurs.

In some implementations, the processor 270 may receive image data obtained by the other vehicle 390 near the user vehicle 100, using the communication unit 210.

The processor 270 may computer-process the image received from the other vehicle 390. Specifically, the processor 270 may detect the user vehicle 100 in the image received from the other vehicle 390. The processor 270 may check the state of the detected user vehicle 100 through image processing.

For example, the processor 270 may receive an image of the user vehicle 100, which is captured by the other vehicle 390 following the user vehicle 100, using the communication unit 210. The processor 270 may detect whether the brake lamps 312 of the user vehicle 100 are on or off, in the received image. The processor 270 may detect whether the brake lamps 312 are on or off, by analyzing the color or brightness of regions corresponding to the brake lamps 312 of the user vehicle 100 in the received image. If the driving speed of the user vehicle 100 increases while the brake lamps 312 are on, the processor 270 may determine that SUA occurs. Herein, the driving speed may be detected based on the object detected by the object detection unit 220. Alternatively, the driving speed may be detected based on a relative speed between the other vehicle 390 and the user vehicle 100 detected in the image received from the other vehicle 390, and a driving speed of the other vehicle 390.

The processor 270 may detect smoke generated due to friction between tires and the road, in the received image. If the smoke is detected, the processor 270 may determine that SUA occurs.

Upon determining that SUA occurs in the vehicle 100, the processor 270 may provide a control signal for cutting power supplied to the vehicle 100. In addition, upon determining that SUA occurs, the processor 270 may transmit SUA information to the external device 370, 380, or 390.

In some implementations, the processor 270 may receive an external control signal from the external device 380 or 390 using the communication unit 210. Herein, the external device 380 or 390 may be the traffic control server 380 or the other vehicle 390 located near the user vehicle 100. Upon determining that SUA occurs, the processor 270 may provide a power cut control signal based on the received external control signal.

In some implementations, the traffic control server 380 located in a traffic control center may receive image data from the other vehicle 390. In this case, the image data may include information for determining whether SUA occurs in the user vehicle 100. The traffic control server 380 determines whether SUA occurs in the user vehicle 100, and may provide an external control signal to the user vehicle 100 upon determining that SUA occurs. Herein, the external control signal may be a control signal for cutting power of the user vehicle 100. That is, the external control signal may be a control signal generated by the traffic control server 380 which receives the image data from the other vehicle 390. In some implementations, when SUA occurs, the object detection unit 220 may detect collision with an object. Herein, the object may be the other vehicle 390 driven ahead, a structure near the road, a pedestrian, or the like.

When SUA occurs, if collision with the object is detected, the processor 270 may provide a steering, suspension, or airbag control signal to the vehicle driving unit 150. For example, when SUA occurs, if collision with the object is detected, the processor 270 may provide a steering control signal to the steering driving unit 152 or provide a suspension control signal to the suspension driving unit 159 to induce a head-on collision between a bumper and the object.

As another example, when SUA occurs, if collision with the object is detected, the processor 270 may provide an airbag inflation signal to the airbag driving unit 157.

In some implementations, the processor 270 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions.

The interface unit 280 may receive data or transmit a signal processed or generated by the processor 270, to the outside. To this end, the interface unit 280 may perform data communication with the sensing unit 125, the controller 170, the vehicle driving unit 150, and the display apparatus 350 of the vehicle 100 in a wired or wireless manner.

The interface unit 280 may receive sensor information from the controller 170 or the sensing unit 125.

Herein, the sensor information may include at least one of vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, vehicle internal humidity information, acceleration pedal pressure information, and brake pedal pressure information.

The sensor information may be acquired using a heading sensor, a yaw sensor, a gyro sensor, a position module, a vehicle drive/reverse sensor, a wheel sensor, a vehicle speed sensor, a vehicle tilt sensor, a battery sensor, a fuel sensor, a tire sensor, a steering sensor, a vehicle internal temperature sensor, a vehicle internal humidity sensor, an acceleration pedal position sensor, a brake pedal position sensor, etc.

In some implementations, in the sensor information, the vehicle direction information, the vehicle location information, the vehicle angle information, the vehicle speed information, and the vehicle tilt information related to vehicle driving may be called vehicle driving information.

The interface unit 280 may receive on or off state information of the brake lamps 312 from the brake lamps 312. Specifically, the interface unit 280 may receive electric current information sensed by the electric current sensor 720 (see FIG. 7) of the brake lamps 312.

The interface unit 280 may receive pedaling information of an acceleration pedal or a brake pedal from the acceleration pedal position sensor or the brake pedal position sensor.

The interface unit 280 may transmit a signal generated by the processor 270, to the controller 170, the vehicle driving unit 150, or the display apparatus 350.

For example, the interface unit 280 may provide a signal for cutting power supplied to the vehicle 100, to the power source driving unit 151 (see FIG. 1B).

The power supply unit 290 may supply power necessary for operation of each element, under control of the processor 270. Particularly, the power supply unit 290 may receive power supplied from, for example, a battery of the vehicle 100.

Figure 4:
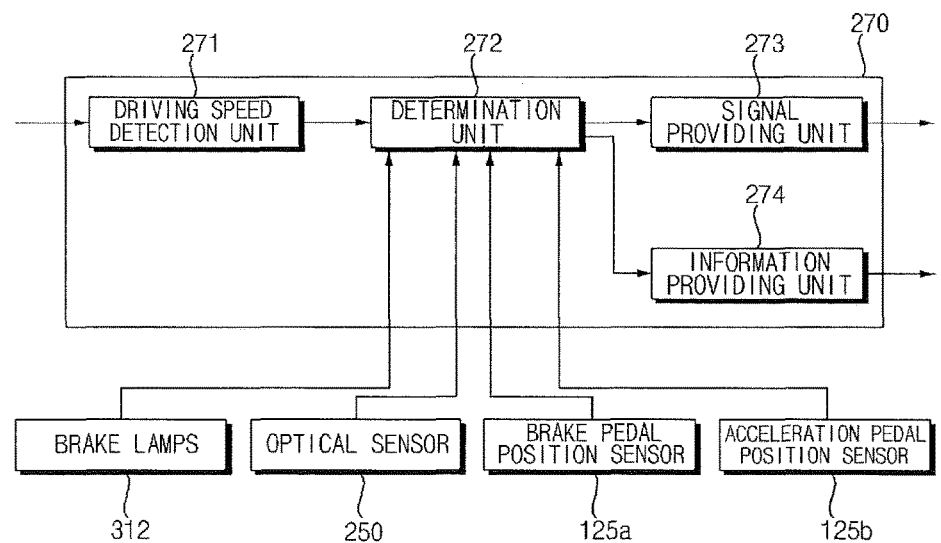
FIG. 4 is a block diagram illustrating an example of a processor of the vehicle assistance apparatus, according to a first implementation.

FIG. 4 is a block diagram of the processor 270 of the vehicle assistance apparatus 200, according to a first implementation.

Referring to FIG. 4, the processor 270 may include a driving speed detection unit 271, a determination unit 272, a signal providing unit 273, and an information providing unit 274.

The driving speed detection unit 271 may detect a driving speed of the vehicle 100.

The driving speed detection unit 271 may calculate a speed relative to a detected object.

As an example, the driving speed detection unit 271 may detect a distance from the vehicle 100 to the object and the speed relative to the object based on a variation in size of the object detected in images sequentially obtained by the mono camera 221a as time passes.

As another example, the driving speed detection unit 271 may detect the distance to and the speed relative to the object using a disparity detected in stereo images obtained by the stereo camera 221b.

As another example, the driving speed detection unit 271 may detect the distance to and the speed relative to the object based on a TOF to the object detected by the radar 223, the lidar 224, or the ultrasonic sensor 225.

If the object is a still object (e.g., a tree, a street light, a traffic light, or a traffic sign), the driving speed detection unit 271 may detect the driving speed of the vehicle 100 based on the speed relative to the object.

The determination unit 272 may determine whether SUA occurs.

The determination unit 272 may receive electric current information about an electric current flowing from the battery 710 (see FIG. 7) to the brake lamps 312, from the electric current sensor 720 (see FIG. 7) of the brake lamps 312.

The determination unit 272 may receive on or off state information of the brake lamps 312 from the optical sensor 250.

If the optical sensor 250 senses light having a value equal to or greater than a reference value, the processor 270 may determine that the brake lamps 312 are on.

If the driving speed increases while the brake lamps 312 are on, the determination unit 272 may determine that SUA occurs.

The determination unit 272 may receive pedaling information of an acceleration pedal or a brake pedal from an acceleration pedal position sensor 125b or a brake pedal position sensor 125a.

Alternatively, if the vehicle 100 is accelerated while the acceleration pedal is not depressed, the determination unit 272 may determine that SUA occurs in the vehicle 100.

Otherwise, if the vehicle 100 is accelerated while the brake pedal is depressed, the determination unit 272 may determine that SUA occurs in the vehicle 100.

Upon determining that SUA occurs, the signal providing unit 273 may provide a control signal for cutting power supplied to the vehicle 100.

For example, if the vehicle 100 uses an internal combustion engine, the signal providing unit 273 may provide a power cut control signal to a throttle body. Herein, the power cut control signal may be a control signal for switching a throttle valve to a closed state to cut fuel.

As another example, if the vehicle 100 uses an electric motor, the signal providing unit 273 may provide a power cut control signal to a motor controller. Herein, the power cut control signal may be a control signal for cutting power provided by the motor.

Upon determining that SUA occurs, the information providing unit 274 may transmit SUA information to the external device 370, 380, or 390.

The information providing unit 274 may transmit the SUA information to the external device 370, 380, or 390 together with GPS information of the vehicle 100.

Upon determining that SUA occurs in the vehicle 100, the information providing unit 274 may transmit image data obtained by the camera 221, to the external device 370, 380, or 390. In this case, the image data may be real-time image data obtained by the camera 221. Alternatively, the image data may be image data stored in the memory 230 from when the determination unit 272 determines that SUA occurs.

Figure 5:
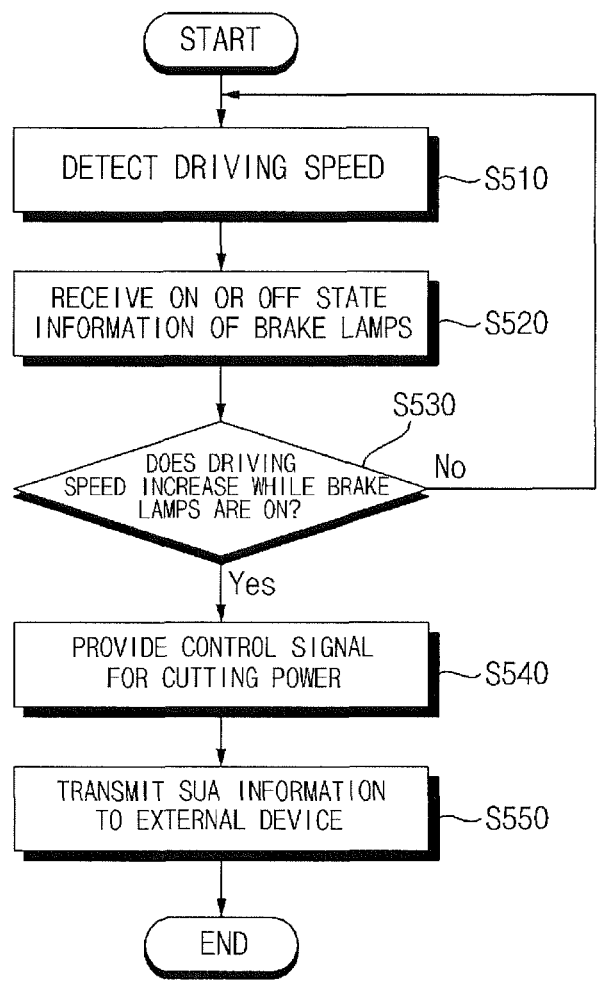
FIG. 5 is a flowchart illustrating an example of operations of the vehicle assistance apparatus, according to the first implementation.

FIG. 5 is a flowchart for describing operation of the vehicle assistance apparatus 200, according to the first implementation.

Referring to FIG. 5, the processor 270 may detect a driving speed based on an object detected by the object detection unit 220 (S510).

The processor 270 may calculate a distance to and a speed relative to the detected object. Alternatively, the processor 270 may receive information about the distance to and the speed relative to the object from the object detection unit 220.

As an example, the processor 270 may detect the distance from the vehicle 100 to the object and the speed relative to the object based on a variation in size of the object detected in images sequentially obtained by the mono camera 221a as time passes.

As another example, the processor 270 may detect the distance to and the speed relative to the object using a disparity detected in stereo images obtained by the stereo camera 221*b*.

As another example, the processor 270 may detect the distance to and the speed relative to the object based on a TOF to the object detected by the radar 223, the lidar 224, or the ultrasonic sensor 225.

If the object is a still object (e.g., a tree, a street light, a traffic light, or a traffic sign), the processor 270 may detect the driving speed of the vehicle 100 based on the speed relative to the object.

The processor 270 may receive on or off state information of the brake lamps 312 (S520).

The processor 270 may receive current information about a current flowing from the battery 710 (see FIG. 7) to the brake lamps 312, from the current sensor 720 (see FIG. 7) of the brake lamps 312. If a current having a value equal to or greater than a reference value flows to the brake lamps 312, the processor 270 may determine that the brake lamps 312 are on.

The processor 270 may determine whether SUA occurs, based on the driving speed and the on-state or the off-state information of the brake lamps 312 (S530). Herein, the on or off state information of the brake lamps 312 may be acquired based on information received from the current sensor 720 (see FIG. 7) of the brake lamps 312, or the optical sensor 250.

Specifically, if the driving speed increases while the brake lamps 312 are on, the processor 270 may determine that SUA occurs.

Upon determining that SUA occurs in the vehicle 100, the processor 270 may provide a control signal for cutting power supplied to the vehicle 100 (S540).

For example, if the vehicle 100 uses an internal combustion engine, the processor 270 may provide a power cut control signal to a throttle body. Herein, the power cut control signal may be a control signal for switching a throttle valve to a closed state to cut fuel.

As another example, if the vehicle 100 uses an electric motor, the processor 270 may provide a power cut control signal to a motor controller. Herein, the power cut control signal may be a control signal for cutting power provided by the motor.

Upon determining that SUA occurs, the processor 270 may transmit SUA information to the external device 370, 380, or 390 (S550). Herein, the external device 370, 380, or 390 may be the mobile device 370, the external server 380, or the other vehicle 390. The external server 380 may be a traffic control server.

The processor 270 may transmit the SUA information to the external device 370, 380, or 390 together with GPS information of the vehicle 100.

Upon determining that SUA occurs in the vehicle 100, the processor 270 may transmit image data obtained by the camera 221, to the external device 370, 380, or 390. In this case, the image data may be real-time image data obtained by the camera 221. Alternatively, the image data may be image data stored in the memory 230 from when the processor 270 determines that SUA occurs.

Figure 6:
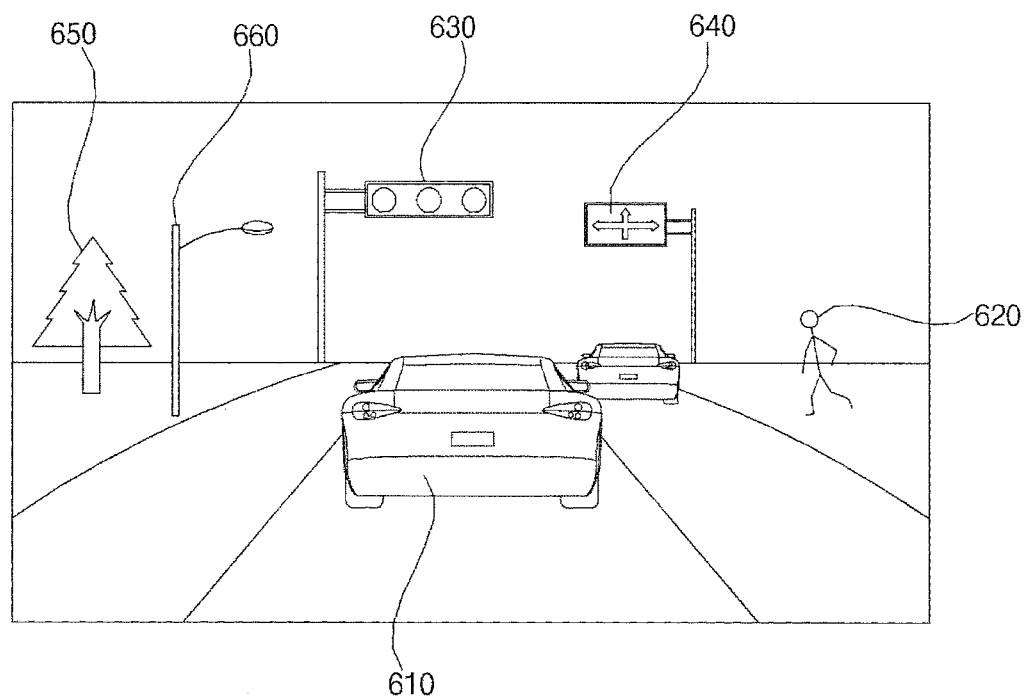
FIG. 6 is a diagram illustrating an example of an operation for detecting a driving speed of the vehicle.

FIG. 6 is a reference view for describing an operation for detecting a driving speed of the vehicle 100, according to an implementation.

Referring to FIG. 6, the camera 221 may obtain an ahead-vehicle image.

The processor 270 may detect an object in the obtained image and track the detected object. Herein, the object may be another vehicle 610, a pedestrian 620, a traffic light 630, a traffic sign 640, a tree 650, or a street light 660.

The processor 270 may detect a distance to and a speed relative to the detected object.

If the camera 221 is the mono camera 221*a*, the processor 270 may track the object detected in sequentially obtained images. As the vehicle 100 moves, the size of the object in the obtained image may vary. That is, the size of the object may vary as a relative distance between the vehicle 100 and the object varies. In this case, the processor 270 may detect the distance from the vehicle 100 to the object based on the variation in size of the detected object as time passes. The processor 270 may detect the speed relative to the object based on the distance to the object per unit time.

If the camera 221 is the stereo camera 221*b*, the processor 270 may detect a disparity in stereo images due to the distance between two cameras. The processor 270 may detect the distance to the object using the detected disparity. The processor 270 may detect the speed relative to the object based on the distance to the object per unit time.

In some implementations, the object may be a still object. For example, the object may be the traffic light 630, the traffic sign 640, the tree 650, or the street light 660. In this case, the processor 270 may detect a driving speed of the vehicle 100 based on the speed relative to the object. Since the object stands still, the speed relative to the object may be converted into the driving speed of the vehicle 100.

FIG. 7 is a reference view for describing an operation for checking on or off state of the brake lamps 312, according to an implementation.

Referring to FIG. 7, the brake lamps 312 may include a light output unit 715 and the current sensor 720.

The light output unit 715 may receive electrical energy from the battery 710 and output light 730.

The current sensor 720 may sense a current 711 flowing from the battery 710 to the light output unit 715.

The vehicle assistance apparatus 200 may receive information about the current 711 flowing to the brake lamps 312 and, more particularly, into the light output unit 715, from the current sensor 720. That is, the vehicle assistance apparatus 200 may receive information indicating whether the current 711 flows to the light output unit 715.

In some implementations, the optical sensor 250 included in the vehicle assistance apparatus 200 may sense the light 730 output from the brake lamps 312 and, more particularly, from the light output unit 715. Herein, the light 730 may be red.

Figure 8:
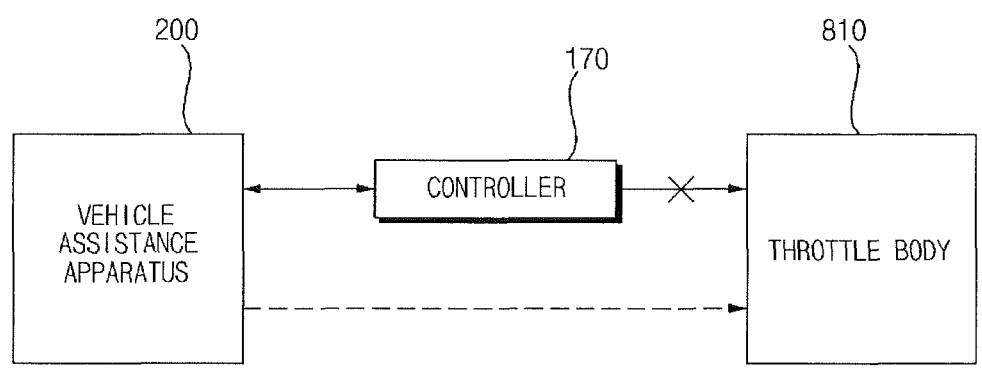
FIG. 8 is a diagram illustrating an example of an operation for controlling a throttle body when sudden unintended acceleration (SUA) occurs.

FIG. 8 is a reference view for describing an operation for controlling a throttle body 810 when SUA occurs, according to an implementation.

Referring to FIG. 8, upon determining that SUA occurs, the vehicle assistance apparatus 200 may transmit a test signal to the controller 170. The vehicle assistance apparatus 200 may determine whether the controller 170 malfunctions, by receiving a return signal corresponding to the test signal. Upon determining that the controller 170 malfunctions, the vehicle assistance apparatus 200 may ultimately determine an SUA state of the vehicle 100.

Herein, the test signal and the return signal may be predefined. For example, the vehicle assistance apparatus 200 transmits any number among 1 to 10 as the test signal to the controller 170. Thereafter, the vehicle assistance apparatus 200 may receive a number obtained by multiplying the transmitted number by 5, as the return signal. In this case, the return signal obtained by multiplying the transmitted number by 5 is predefined. If the predefined return signal is not received, the vehicle assistance apparatus 200 may determine that the controller 170 malfunctions.

As described above, when SUA is determined, by further determining whether the controller 170 malfunctions, the reliability of the determination of SUA may be increased.

Upon determining that SUA occurs, the vehicle assistance apparatus 200 may provide a control signal for cutting power supplied to the vehicle 100. Herein, the control signal may be transmitted to the power source driving unit 151.

For example, if the vehicle 100 uses an internal combustion engine, the processor 270 may provide a power cut control signal to the throttle body 810. Herein, the power cut control signal may be a control signal for switching a throttle valve to a closed state to cut fuel.

Upon determining that the controller 170 malfunctions, the controller 170 may not appropriately transmit a control signal to the throttle body 810. In this case, the vehicle assistance apparatus 200 may transmit a fuel cut control signal to the throttle body 810. At this time, the vehicle 100 stops and large accidents due to SUA may be prevented.

Figure 9:
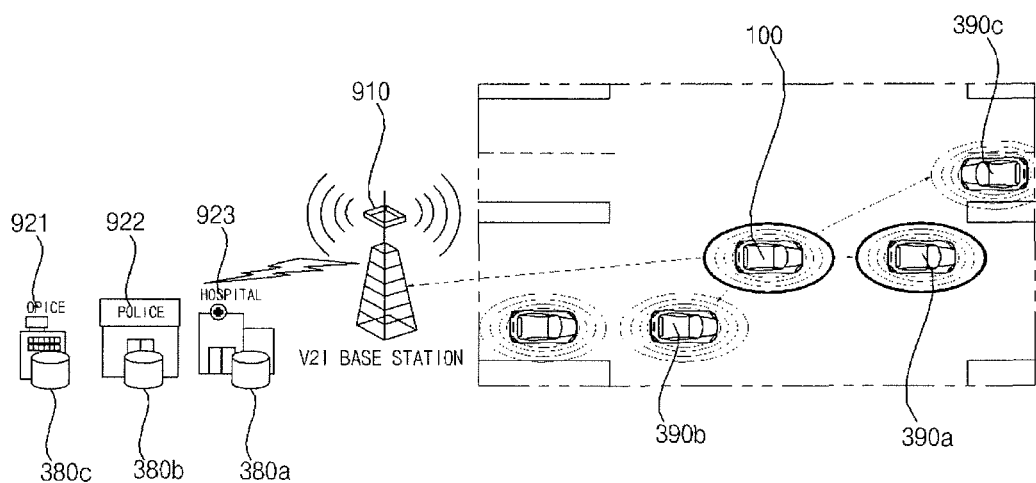
FIG. 9 is a diagram illustrating an example of an operation for transmitting SUA information to an external device when SUA occurs.

FIG. 9 is a reference view for describing an operation for transmitting SUA information to the external device 370, 380, or 390 when SUA occurs, according to an implementation.

Referring to FIG. 9, when SUA occurs in the vehicle 100, the vehicle assistance apparatus 200 may transmit SUA information to the external device 370, 380, or 390, using the communication unit 210.

Specifically, the vehicle assistance apparatus 200 may transmit the SUA information to other vehicles 390a, 390b, and 390c located near the user vehicle 100, through V2V communication.

In addition, the vehicle assistance apparatus 200 may transmit the SUA information via a V2I base station 910 to external servers 380a, 380b, and 380c through V2I communication. Herein, the external servers 380a, 380b, and 380c may be located in a hospital 923, a police station 922, and a traffic control center 921.

In some implementations, the vehicle assistance apparatus 200 may transmit the SUA information to the external device 370, 380, or 390 together with GPS information of the vehicle 100.

Figure 10:
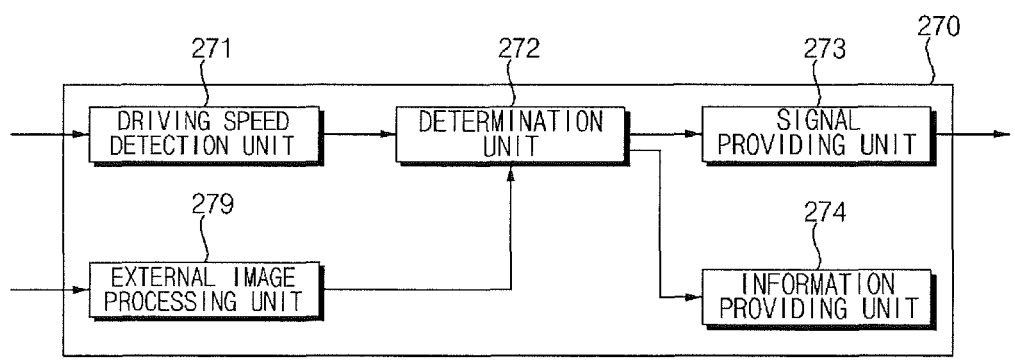
FIG. 10 is a block diagram illustrating an example of the processor of the vehicle assistance apparatus, according to a second implementation.

The vehicle assistance apparatus 200 may transmit the SUA information to the external device 370, 380, or 390 together with image data obtained by the camera 221. FIG. 10 is a block diagram of the processor 270 of the vehicle assistance apparatus 200, according to a second implementation.

Referring to FIG. 10, the processor 270 may include the driving speed detection unit 271, an external image processing unit 279, the determination unit 272, the signal providing unit 273, and the information providing unit 274.

The driving speed detection unit 271 may detect a driving speed of the vehicle 100.

The driving speed detection unit 271 may calculate a distance to and a speed relative to a detected object.

For example, the driving speed detection unit 271 may detect the distance from the vehicle 100 to the object and the speed relative to the object based on a variation in size of the object detected in images sequentially obtained by the mono camera 221a as time passes.

As another example, the driving speed detection unit 271 may detect the distance to and the speed relative to the object using a disparity detected in stereo images obtained by the stereo camera 221b.

As another example, the driving speed detection unit 271 may detect the distance to and the speed relative to the object based on a TOF to the object detected by the radar 223, the lidar 224, or the ultrasonic sensor 225.

If the object is a still object (e.g., a tree, a street light, a traffic light, or a traffic sign), the driving speed detection unit 271 may detect the driving speed of the vehicle 100 based on the speed relative to the object.

The external image processing unit 279 may perform computer-processing on image data received from the other vehicle 390 located near the user vehicle 100.

Specifically, the external image processing unit 279 may detect the user vehicle 100 in the image received from the other vehicle 390. The external image processing unit 279 may check the state of the detected user vehicle 100 through image processing.

For example, the external image processing unit 279 may receive an image of the user vehicle 100, which is captured by the other vehicle 390 following the user vehicle 100, using the communication unit 210. The external image processing unit 279 may detect whether the brake lamps 312 of the user vehicle 100 are on or off, in the received image. The external image processing unit 279 may detect whether the brake lamps 312 are on or off, by analyzing the color or brightness of regions corresponding to the brake lamps 312 of the user vehicle 100, in the received image.

The external image processing unit 279 may detect smoke generated due to friction between tires and the road, in the received image.

The determination unit 272 may determine whether SUA occurs.

If the driving speed increases while the brake lamps 312 are on, the determination unit 272 may determine that SUA occurs.

If the smoke generated due to friction between tires and the road is detected in the received image, the determination unit 272 may determine that SUA occurs.

Upon determining that SUA occurs, the signal providing unit 273 may provide a control signal for cutting power supplied to the vehicle 100.

For example, if the vehicle 100 uses an internal combustion engine, the signal providing unit 273 may provide a power cut control signal to a throttle body. Herein, the power cut control signal may be a control signal for switching a throttle valve to a closed state to cut fuel.

As another example, if the vehicle 100 uses an electric motor, the signal providing unit 273 may provide a power cut control signal to a motor controller. Herein, the power cut control signal may be a control signal for cutting power provided by the motor.

Upon determining that SUA occurs, the information providing unit 274 may transmit SUA information to the external device 370, 380, or 390.

The information providing unit 274 may transmit the SUA information to the external device 370, 380, or 390 together with GPS information of the vehicle 100.

Upon determining that SUA occurs in the vehicle 100, the information providing unit 274 may transmit image data obtained by the camera 221, to the external device 370, 380, or 390. In this case, the image data may be real-time image data obtained by the camera 221. Alternatively, the image data may be image data stored in the memory 230 from when the determination unit 272 determines that SUA occurs.

Figure 11:
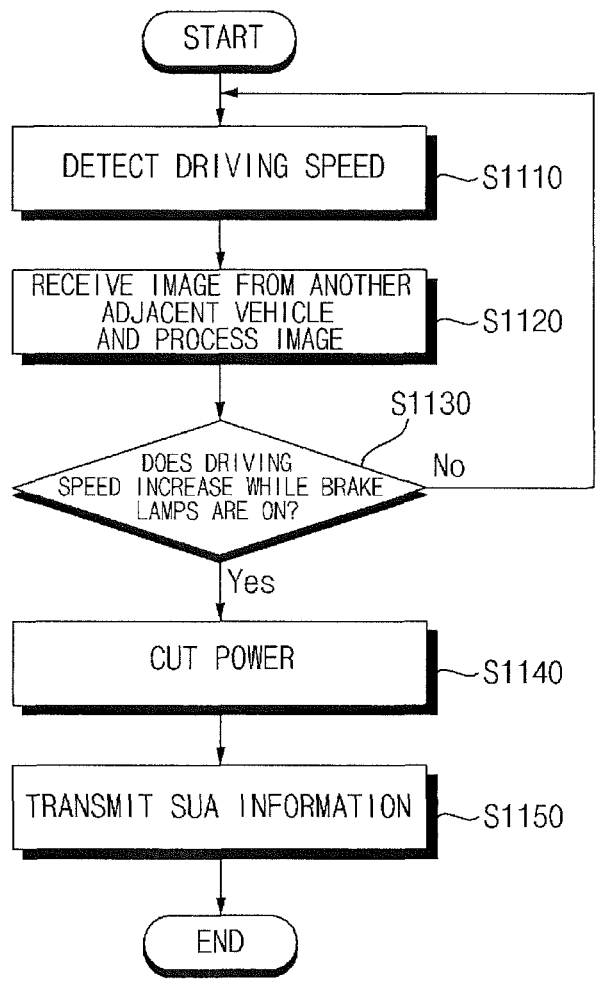
FIG. 11 is a flowchart illustrating an example of operations of the vehicle assistance apparatus, according to the second implementation.

FIG. 11 is a flowchart for describing operation of the vehicle assistance apparatus 200, according to the second implementation.

Referring to FIG. 11, the processor 270 may detect a driving speed based on an object detected by the object detection unit 220 (S1110).

The processor 270 may calculate a distance to and a speed relative to the detected object. Alternatively, the processor 270 may receive information about the distance to and the speed relative to the object from the object detection unit 220.

As an example, the processor 270 may detect the distance from the vehicle 100 to the object and the speed relative to the object based on a variation in size of the object detected in images sequentially obtained by the mono camera 221a as time passes.

As another example, the processor 270 may detect the distance to and the speed relative to the object using a disparity detected in stereo images obtained by the stereo camera 221b.

As another example, the processor 270 may detect the distance to and the speed relative to the object based on a TOF to the object detected by the radar 223, the lidar 224, or the ultrasonic sensor 225.

If the object is a still object (e.g., a tree, a street light, a traffic light, or a traffic sign), the processor 270 may detect the driving speed of the vehicle 100 based on the speed relative to the object.

The processor 270 may receive image data obtained by the other vehicle 390 located near the user vehicle 100, using the communication unit 210 (S1120).

The processor 270 may computer-process the image received from the other vehicle 390. Specifically, the processor 270 may detect the user vehicle 100 in the image received from the other vehicle 390. The processor 270 may check the state of the detected user vehicle 100 through image processing.

For example, the processor 270 may receive an image of the user vehicle 100, which is captured by the other vehicle 390 following the user vehicle 100, using the communication unit 210. The processor 270 may detect whether the brake lamps 312 of the user vehicle 100 are on or off, in the received image. The processor 270 may detect whether the brake lamps 312 are on or off, by analyzing the color or brightness of regions corresponding to the brake lamps 312 of the user vehicle 100, in the received image.

The processor 270 may detect smoke generated due to friction between tires and the road, in the received image.

The processor 270 may determine whether SUA occurs, based on the driving speed and the image data (S1130).

Specifically, if the driving speed increases while the brake lamps 312 are on, the processor 270 may determine that SUA occurs.

If the smoke generated due to friction between tires and the road is detected in the received image, the processor 270 may determine that SUA occurs.

Upon determining that SUA occurs in the vehicle 100, the processor 270 may provide a control signal for cutting power supplied to the vehicle 100 (S1140).

For example, if the vehicle 100 uses an internal combustion engine, the processor 270 may provide a power cut control signal to a throttle body. Herein, the power cut control signal may be a control signal for switching a throttle valve to a closed state to cut fuel.

As another example, if the vehicle 100 uses an electric motor, the processor 270 may provide a power cut control signal to a motor controller. Herein, the power cut control signal may be a control signal for cutting power provided by the motor.

Upon determining that SUA occurs, the processor 270 may transmit SUA information to the external device 370, 380, or 390 (S1150). Herein, the external device 370, 380, or 390 may be the mobile device 370, the external server 380, or the other vehicle 390. The external server 380 may be a traffic control server.

The processor 270 may transmit the SUA information to the external device 370, 380, or 390 together with GPS information of the vehicle 100.

Upon determining that SUA occurs in the vehicle 100, the processor 270 may transmit image data obtained by the camera 221, to the external device 370, 380, or 390. In this case, the image data may be real-time image data obtained by the camera 221. Alternatively, the image data may be image data stored in the memory 230 from when the processor 270 determines that SUA occurs.

Figure 12:
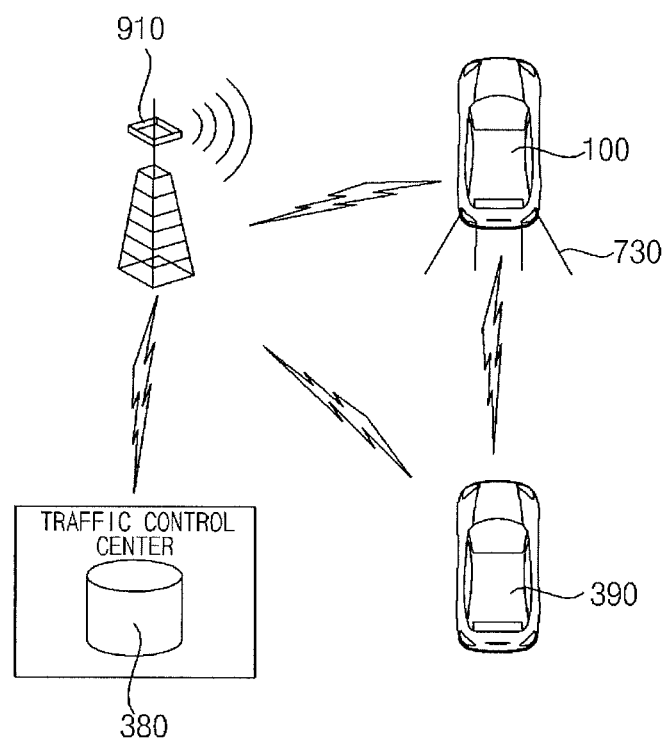
FIG. 12 is a block diagram illustrating an example of an operation for receiving image data from another vehicle.

FIG. 12 is a reference view for describing an operation for receiving image data from the other vehicle 390, according to an implementation.

Referring to FIG. 12, the vehicle assistance apparatus 200 may receive image data from the other vehicle 390 following the user vehicle 100, using the communication unit 210. In this case, the image data received from the other vehicle 390 may include an image of the user vehicle 100.

The vehicle assistance apparatus 200 may detect on or off state of the brake lamps 312 of the user vehicle 100 by computer-processing the received image. The vehicle assistance apparatus 200 may detect whether the brake lamps 312 are on or off, by analyzing the color or brightness of regions corresponding to the brake lamps 312 of the user vehicle 100 in the received image. If the driving speed increases while the brake lamps 312 are on, the vehicle assistance apparatus 200 may determine that SUA occurs.

Herein, the driving speed may be detected based on an object detected by the object detection unit 220. Alternatively, the driving speed may be detected based on a relative speed between the other vehicle 390 and the user vehicle 100 detected in the image received from the other vehicle 390, and a driving speed of the other vehicle 390. In addition, the vehicle assistance apparatus 200 may detect smoke generated due to friction between tires and the road, in the received image. If the smoke is detected, the vehicle assistance apparatus 200 may determine that SUA occurs.

In some implementations, the traffic control server 380 located in a traffic control center may receive image data from the other vehicle 390. In this case, the image data may include information for determining whether SUA occurs in the user vehicle 100. The traffic control server 380 determines whether SUA occurs in the user vehicle 100, and may provide an external control signal to the user vehicle 100 upon determining that SUA occurs. Herein, the external control signal may be a control signal for cutting power of the user vehicle 100.

Figure 13:
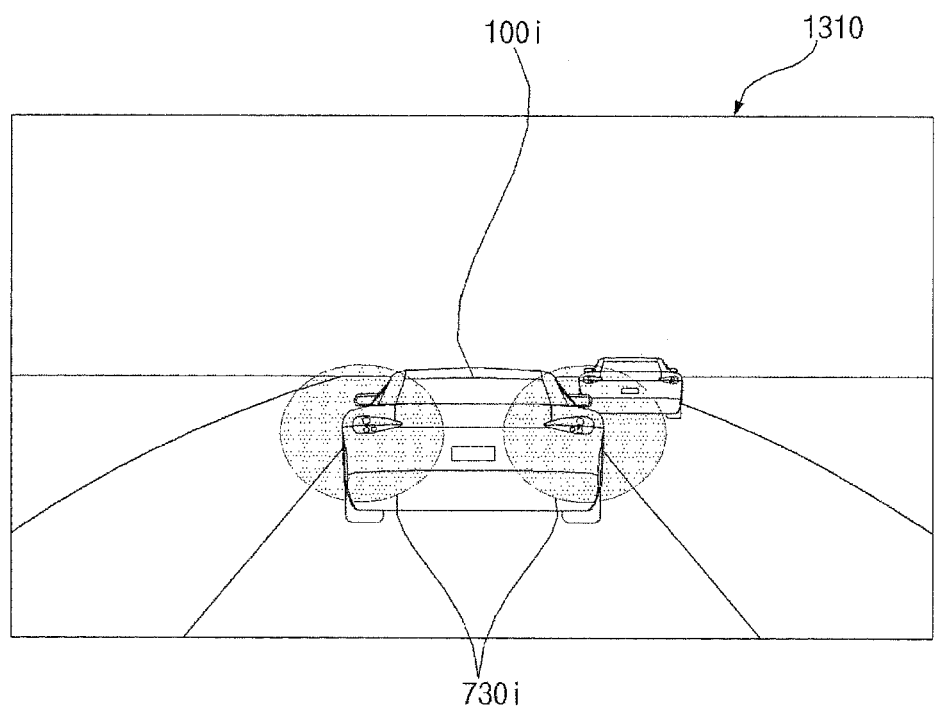
FIGS. 13 to 15 are block diagrams illustrating examples of operations for determining SUA.
Figure 14:
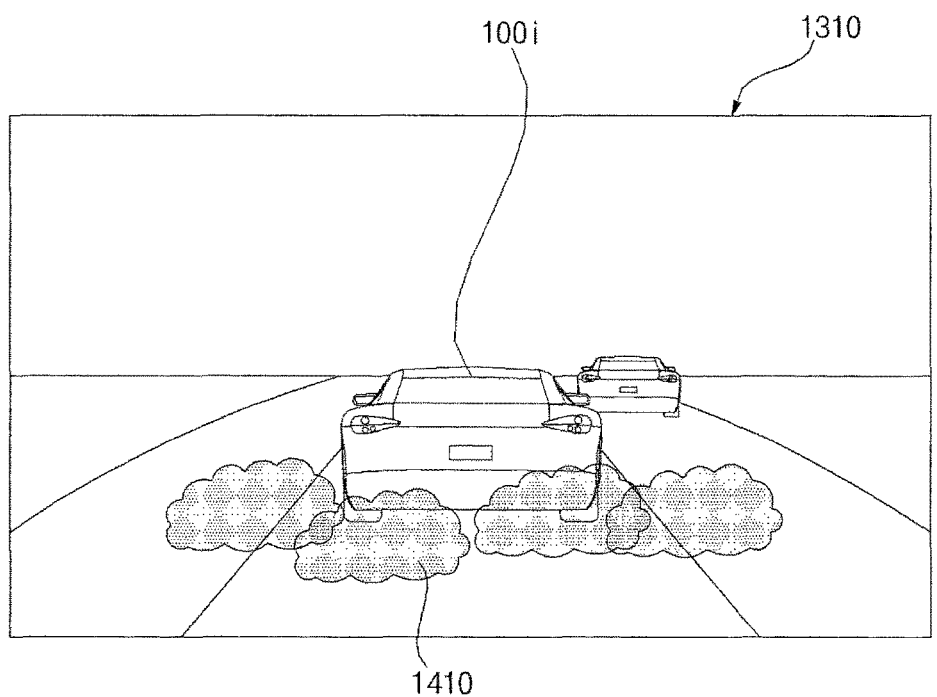
Figure 15:
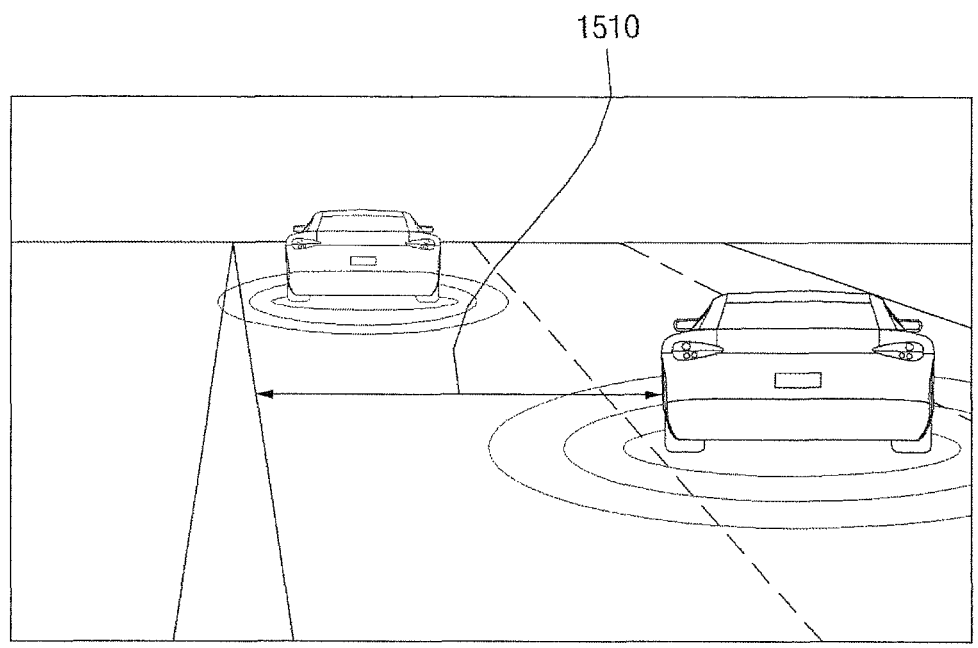

FIGS. 13 to 15 are reference views for describing an operation for determining SUA, according to an implementation.

Referring to FIG. 13, an image obtained by the other vehicle 390 following the user vehicle 100 may include a user vehicle image 100i.

The vehicle assistance apparatus 200 may receive the image 1310 including the user vehicle image 100i from the other vehicle 390. The processor 270 of the vehicle assistance apparatus 200 may detect whether the brake lamps 312 are on or off, in the image 1310. The processor 270 may detect whether the brake lamps 312 are on or off, by analyzing the color or brightness of regions 730i corresponding to the brake lamps 312 of the user vehicle 100 in the received image 1310.

In some implementations, the processor 270 of the vehicle assistance apparatus 200 may detect a driving speed of the user vehicle 100 based on the user vehicle image 100i in the image 1310.

Specifically, if the image 1310 is a mono image, the processor 270 may detect the driving speed of the user vehicle 100 based on a variation in size of the user vehicle image 100i as time passes.

Otherwise, if the image 1310 is a stereo image, the processor 270 may detect the driving speed of the user vehicle 100 based on a disparity.

Referring to FIG. 14, the image 1310 obtained by the other vehicle 390 following the user vehicle 100 may include a smoke image 1410 due to friction between tires of the user vehicle 100 and the road.

Referring to FIG. 15, the vehicle 100 may include the ultrasonic sensor 225. The number of sampling data recognized by the ultrasonic sensor 225 varies depending on the driving speed of the vehicle 100.

For example, if the vehicle 100 is driven at 15 km/h, the number of data received by the ultrasonic sensor 225 may be 100. If the vehicle 100 is driven at 30 km/h, the number of data received by the ultrasonic sensor 225 is reduced to 50.

In some implementations, the vehicle assistance apparatus 200 may calculate the speed of the vehicle 100 by receiving acceleration pedal information, brake pedal information, engine revolutions per minute (RPM) information, and gear ratio information of the vehicle 100. The vehicle assistance apparatus 200 may compare the calculated speed of the vehicle 100 to the number of sampling data received by the ultrasonic sensor 225. If the number of sampling data is very small compared to the speed of the vehicle 100, the vehicle assistance apparatus 200 may determine that the vehicle 100 malfunctions.

As is apparent from the above description, the implementations have one or more of the following effects.

First, since sudden unintended acceleration (SUA) is determined based on an on-state or an off-state of brake lamps and a vehicle speed detected by an object detection unit, without control of an electronic control unit (ECU), SUA may be accurately determined.

Second, when SUA occurs, since a vehicle assistance apparatus directly controls a throttle body without control of the ECU, an accident may be prevented.

Third, since on or off state of brake lamps can be determined based on an image received from another vehicle, SUA may be accurately determined.

Fourth, since SUA information is transmitted to an external device, the external device may be prepared for SUA.

Although some advantages have been described above, advantages are not limited thereto.

Implementations can also be embodied as computer-readable code on a computer-readable recording medium. The computer-readable recording medium is any data storage device that can store data which can thereafter be read by a computer system. Examples of the computer-readable recording medium include hard disk drives (HDDs), solid state disks (SSDs), silicon disk drives (SDDs), read-only memory (ROM), random-access memory (RAM), CD-ROMs, magnetic tapes, floppy disks, optical data storage devices, and carrier waves (such as data transmission over the Internet). In addition, the computer may include the controller 170 or the processor 270. Although some implementations have been disclosed for illustrative purposes, additions and substitutions are possible in various implementations.

What is claimed is:

1. A vehicle assistance apparatus comprising:
   an interface unit configured to receive information regarding an electric current provided to a brake lamp of a vehicle;
   an object detection unit configured to detect an object outside the vehicle; and
   a processor configured to:
      determine, based on the detected object, a speed of the vehicle;
      determine, based on the determined speed of the vehicle and the information regarding the electric current provided to the brake lamp of the vehicle, whether the vehicle undergoes acceleration during a braking operation of the vehicle; and
      provide, based on a determination that the vehicle undergoes acceleration during the braking operation of the vehicle, a control signal to restrict further acceleration of the vehicle,
   wherein the processor is configured to determine that the vehicle undergoes acceleration during the braking operation of the vehicle by:
      determining whether the speed of the vehicle increases while the electric current flows to the brake lamp of the vehicle; and
      based on a determination that the speed of the vehicle increases while the electric current flows to the brake lamp, determining that the vehicle undergoes acceleration during the braking operation of the vehicle.

2. The vehicle assistance apparatus according to claim 1, wherein the object detection unit comprises a camera configured to acquire images of the object outside the vehicle, and
   wherein the processor is configured to determine the speed of the vehicle by:
      determining, based on the acquired images of the object, a time-variation of a size of the object in the acquired images; and
      determining, based on the determined rate of the time-variation of the size of the object in the acquired images, the speed of the vehicle.

3. The vehicle assistance apparatus according to claim 1, wherein the object detection unit comprises a stereo camera configured to acquire stereo images of the object outside the vehicle, and
   wherein the processor is configured to determine the speed of the vehicle by:
      determining, based on the acquired stereo images of the object, a disparity of the object in the acquired stereo images; and
      determining, based on the determined disparity of the object in the acquired stereo images, the speed of the vehicle.

4. The vehicle assistance apparatus according to claim 1, wherein the object detection unit comprises at least one of a radar, a lidar, or an ultrasonic sensor, and
   wherein the processor is configured to determine the speed of the vehicle by:
      determining a time of flight (TOF) to the object outside the vehicle; and
      determining, based on the determined TOF to the object, the speed of the vehicle.

5. The vehicle assistance apparatus according to claim 1, wherein the interface unit is configured to receive information regarding an acceleration pedal or a brake pedal of the vehicle, and
wherein the processor is configured to determine that the vehicle undergoes acceleration during the braking operation of the vehicle further based on the information regarding the acceleration pedal or the brake pedal of the vehicle.

6. The vehicle assistance apparatus according to claim 1, further comprising an optical sensor configured to sense an on-state or an off-state of the brake lamp of the vehicle,
wherein the processor is further configured to determine that the vehicle undergoes acceleration during the braking operation of the vehicle further based on the on-state or the off-state of the brake lamp of the vehicle.

7. The vehicle assistance apparatus according to claim 1, wherein the processor is configured to provide the control signal to restrict further acceleration of the vehicle by:
providing a signal to switch, to an off-state, a throttle valve of the vehicle.

8. The vehicle assistance apparatus according to claim 1, wherein the processor is configured to provide the control signal to restrict further acceleration of the vehicle by:
providing a signal for cutting power provided by a motor of the vehicle.

9. The vehicle assistance apparatus according to claim 1, wherein the processor is further configured to:
based on the determination that the vehicle undergoes acceleration during the braking operation of the vehicle, transmit a test signal to a vehicle controller;
receive, from the vehicle controller, a return signal corresponding to the transmitted test signal; and
determine a state of the vehicle controller based on the received return signal.

10. The vehicle assistance apparatus according to claim 1, further comprising a communication unit configured to exchange data with an external device,
wherein the processor is further configured to, based on the determination that the vehicle undergoes acceleration during the braking operation of the vehicle, transmit, to the to the external device, information regarding the acceleration during the braking operation of the vehicle.

11. The vehicle assistance apparatus according to claim 10, wherein the interface unit is further configured to receive global positioning system (GPS) information of the vehicle, and
wherein the processor is further configured to, based on the determination that the vehicle undergoes acceleration during the braking operation of the vehicle, transmit the GPS information to the external device.

12. The vehicle assistance apparatus according to claim 10, wherein the object detection unit comprises a camera configured to obtain image data, and
wherein the processor is further configured to, based on the determination that the vehicle undergoes acceleration during the braking operation of the vehicle, transmit the image data to the external device.

13. A vehicle assistance apparatus comprising:
an object detection unit configured to detect an object outside a vehicle;
a communication unit configured to receive an image obtained by an adjacent vehicle; and
a processor configured to:
determine, based on the object detected outside the vehicle, a speed of the vehicle,
detect, in the received image, an on-state or an off-state of a brake lamp of the vehicle,
determine, based on the determined speed of the vehicle and the on-state or the off-state of the brake lamp, whether the vehicle undergoes acceleration during a braking operation of the vehicle, and
provide, based on a determination that the vehicle undergoes acceleration during the braking operation of the vehicle, a control signal to restrict further acceleration of the vehicle,
wherein the processor is configured to determine that the vehicle undergoes acceleration during the braking operation of the vehicle by:
determining whether the speed of the vehicle increases while the brake lamp of the vehicle is in the on-state; and
based on a determination that the speed of the vehicle increases while the brake lamp of the vehicle is in the on-state, determining that the vehicle undergoes acceleration during the braking operation of the vehicle.

14. The vehicle assistance apparatus according to claim 13, wherein the processor is further configured to determine that the vehicle undergoes acceleration during the braking operation of the vehicle by:
detecting, in the received image, smoke that is generated between at least one tire of the vehicle and a road; and
based on a detection that smoke is generated between at least one tire of the vehicle and the road, determining that the vehicle undergoes acceleration during the braking operation of the vehicle.

15. The vehicle assistance apparatus according to claim 13,
wherein the communication unit receives an external control signal from an external device, and
wherein the processor is configured to provide the control signal to restrict further acceleration of the vehicle by:
determining whether the external control signal has been received from the external device; and
based on a determination that the vehicle undergoes acceleration during the braking operation of the vehicle and that the external control signal has been received from the external device, providing the control signal to restrict further acceleration of the vehicle.

16. The vehicle assistance apparatus according to claim 15, wherein the external device is another vehicle or a traffic control server.

17. The vehicle assistance apparatus according to claim 15, wherein the external control signal is generated by a traffic control server that receives the image obtained by the adjacent vehicle.

18. A vehicle comprising a vehicle assistance apparatus that comprises:
an interface unit configured to receive information regarding an electric current provided to a brake lamp of a vehicle;
an object detection unit configured to detect an object outside the vehicle; and
a processor configured to:
determine, based on the detected object, a speed of the vehicle;
determine, based on the determined speed of the vehicle and the information regarding the electric current provided to the brake lamp of the vehicle, whether the vehicle undergoes acceleration during a braking operation of the vehicle; and provide, based on a determination that the vehicle undergoes acceleration during the braking operation of the vehicle, a control signal to restrict further acceleration of the vehicle,
wherein the processor is configured to determine that the vehicle undergoes acceleration during the braking operation of the vehicle by:
  determining whether the speed of the vehicle increases while the electric current flows to the brake lamp of the vehicle; and
based on a determination that the speed of the vehicle increases while the electric current flows to the brake lamp, determining that the vehicle undergoes acceleration during the braking operation of the vehicle.

* * * * *